(12) United States Patent  
Suzuki

(10) Patent No.: US 9,429,770 B2  
(45) Date of Patent: Aug. 30, 2016

(54) PROGRESSIVE ADDITION LENS

(71) Applicant: EHS LENS PHILIPPINES, INC., General Trias, Cavite (PH)

(72) Inventor: Yohei Suzuki, Kamiina-gun (JP)

(73) Assignee: EHS LENS PHILIPPINES, INC., Cavite (PH)

(*) Notice: Subject to any disclaimer, the term of this patent is extended or adjusted under 35 U.S.C. 154(b) by 0 days.

(21) Appl. No.: 14/348,796

(22) PCT Filed: Sep. 27, 2012

(86) PCT No.: PCT/JP2012/006167  
§ 371 (c)(1),  
(2) Date: Mar. 31, 2014

(87) PCT Pub. No.: WO2013/046677  
PCT Pub. Date: Apr. 4, 2013

(65) Prior Publication Data  
US 2014/0240662 A1    Aug. 28, 2014

(30) Foreign Application Priority Data

Sep. 29, 2011  (JP) .................................. 2011-215048

(51) Int. Cl.  
*G02C 7/06*  (2006.01)

(52) U.S. Cl.  
CPC .............. *G02C 7/065* (2013.01); *G02C 7/061* (2013.01)

(58) Field of Classification Search  
CPC ........ G02C 7/06; G02C 7/061; G02C 7/063; G02C 7/065; G02C 7/066; G02C 7/068; G02C 7/02  
USPC ............ 351/159.05, 159.06, 159.07, 159.22, 351/159.41, 159.42, 159.46, 159.47, 351/159.52, 231  
See application file for complete search history.

(56) References Cited

U.S. PATENT DOCUMENTS

| 5,719,657 A | 2/1998 | Izawa et al. |
| 5,777,716 A | 7/1998 | Miura |

(Continued)

FOREIGN PATENT DOCUMENTS

| JP | A-8-114775 | 5/1996 |
| JP | A-2007-504485 | 3/2007 |

(Continued)

OTHER PUBLICATIONS

Jun. 5, 2015 Extended Search Report issued in European Application No. 12837281.0.  
International Search Report issued in International Patent Application No. PCT/JP2012/006167 mailed Jan. 15, 2013.

(Continued)

*Primary Examiner* — Scott J Sugarman  
*Assistant Examiner* — Alberto Betancourt  
(74) *Attorney, Agent, or Firm* — Oliff PLC

(57) ABSTRACT

There is provided a progressive addition lens capable of improving both of astigmatism and power error on a peripheral part of a distance area, including a distance area used for a distance vision, and other area different from the distance area, wherein at least one of an eyeball side surface of a wearer and an object side surface in the progressive addition lens is formed into an aspheric form, and when a prescription value T to be obtained from formula "S+C/2" expressed by a prescribed spherical power S and a cylindrical power C, is minus, the area where a power deviation ΔD of a spherical equivalent power D from the prescription value T goes negative, exists on principal sight line in the distance area.

9 Claims, 19 Drawing Sheets

(56) References Cited

U.S. PATENT DOCUMENTS

| | | | |
|---|---|---|---|
| 5,892,565 | A | 4/1999 | Ueno et al. |
| 6,186,627 | B1 | 2/2001 | Obara |
| 6,318,859 | B1 | 11/2001 | Baudart et al. |
| 7,125,118 | B2 * | 10/2006 | Kaga ................... 351/159.42 |
| 2004/0257527 | A1 * | 12/2004 | Qi et al. ................... 351/177 |
| 2006/0176446 | A1 | 8/2006 | Kaga |
| 2007/0109496 | A1 | 5/2007 | Altheimer et al. |
| 2012/0203368 | A1 * | 8/2012 | Altheimer et al. ...... 351/159.76 |

FOREIGN PATENT DOCUMENTS

| | | |
|---|---|---|
| JP | B2-4192899 | 12/2008 |
| JP | A-2009-244600 | 10/2009 |

OTHER PUBLICATIONS

Written Opinion of the International Searching Authority issued in International Patent Application No. PCT/JP2012/006167 mailed Jan. 15, 2013.

* cited by examiner

PROGRESSIVE ADDITION LENS

TECHNICAL FIELD

The present invention relates to a progressive addition lens.

DESCRIPTION OF RELATED ART

As a spectacle lens, a progressive addition lens is given, which has a distance area responding to a distance vision, and a near area responding to a near vision.

In the progressive addition lens, generally the distance area is provided in an upper part (an upper side when wearing spectacles), and the near area is provided in a lower part (lower side when wearing spectacles). A progressive area is provided at an intermediate position between the distance area and the near area, in which a dioptric power is progressively changed, and intermediate areas are provided at both sides of the progressive area. Then, a principal sight line (principal meridian) which is a virtual line on a lens is provided in approximately a center of the distance area, the progressive area, and the near area, where a sight line is passed through when a spectacle wearer views a certain object positioned at a front lower side from a front upper side. Usually the principal sight line runs vertically in the distance area, and insets inward toward a nose side by a convergence for the near vision in the near area.

In order to reduce a generation of astigmatism on the progressive addition lens, one or both of an inner surface opposed to an eye of a wearer, and an outer surface opposed to an object side are formed into an aspherical surface. For example, a first reference line is set in one of the distance area and the near area so as to extend at least in two directions of a radiation direction from a center point near a geometrical center of a lens, and a second reference line is set in the other one of the distance area and the near area so as to extend at least in one direction of the radiation direction from the center point, and an aspherical loading on a dioptric power along each reference line is determined (patent document 1).

There is also a method of manufacturing a progressive spectacle glass, including the step of calculating a spectacle lens in consideration of a calculation of an average use value at a distance vision measurement reference point, wherein a calculated value has a minus desired refraction shift of 0.03 to 0.2 dioptre from an order value at the distance reference point (patent document 2).

According to the patent document 2, plus refractive error at the distance reference point has a greater influence on an optical imaging characteristic than minus, and a frequent generation of the plus refractive error can be prevented, which is caused by eidoptometry and production error.

PRIOR ART DOCUMENT

Patent Document

Patent document 1: Patent Publication No. 4192899
Patent document 2: Japanese Translation of PCT International Application Publication No. 2007-504485

SUMMARY OF THE INVENTION

Problem to be Solved by the Invention

In a conventional example of patent document 1, an optimal aspherical loading is set in each direction for reducing astigmatism. However, by setting the aspherical loading, power error from a prescription value of a spherical equivalent power, becomes larger toward a periphery on a principal sight line.

Usually, power is set so as to be obtained in a front view rather than in a peripheral view, and therefore the spherical equivalent power at a progressive starting point in a distance area is set as a prescribed spherical equivalent power. Accordingly, if the aspherical loading is set so that astigmatism is reduced in a peripheral part of the distance area (upper position, and a relatively far portion from other area in the distance area), the power error becomes maximum in the peripheral part of the distance area, and a regular blur or more than the regular blur is generated in the peripheral part of the distance area. Namely, patent document 1 involves a problem that the power error becomes large in the periphery even if the astigmatism in the peripheral part of the distance area can be reduced.

A subject of a conventional example of patent document 2 is to suppress a frequent generation of plus refractive error (generation of plus power error) at a distance reference point in a minus lens, which is caused by eidoptometry and production error, having a greater influence on the optical imaging characteristic than minus. Therefore, in the conventional example of patent document 2, the distance reference point is set as a reference point for giving power, and a calculated value is a minus value from the order value at the distance reference point. However, both of the astigmatism and the power error in the peripheral part of the distance area cannot be improved.

An object of the present invention is to provide a progressive addition lens capable of improving both of astigmatism and power error in a peripheral part of a distance area.

Means for Solving the Problem

According to an aspect of the present invention, there is provided a progressive addition lens, including a distance area used for a distance vision, and other area different from the distance area, wherein at least one of an eyeball side surface of a wearer and an object side surface in the progressive addition lens is formed into an aspheric form, and when a prescription value T to be obtained from formula "S+C/2" expressed by a prescribed spherical power S and a cylindrical power C, is minus, the area where power deviation $\Delta D$ from the prescription value T of spherical equivalent power D goes negative, exists on principal sight line in the distance area.

According to this structure, when the prescription value T obtained from formula "S+C/2" is minus (in a case of a minus lens), conventionally, a progressive starting point is the prescription value T, and the spherical equivalent power D is changed to the positive side from the prescription value T toward the peripheral portion of the distance area from the progressive starting point, and great power error is generated in the periphery of the distance area, resulting in generating a regular blur or more than the regular blur.

In this aspect, the area where the power deviation $\Delta D$ from the prescription value T of the spherical equivalent power D is minus, exists in the distance area. Therefore, even if the spherical equivalent power D changes towards the peripheral portion of the distance area to the positive side, the power error between the spherical equivalent power D and the prescription value T around the distance area becomes smaller than conventional power error.

Note that the spherical equivalent power is an average value of the power on a principal meridian in two directions in a lens. In the lens including astigmatism prescription, the prescription value T "S+C/2" is the average value of the power on the principal meridian in two directions. Namely, the prescription value T is a "prescribed spherical equivalent power" calculated from prescribed spherical power S and cylindrical power C. By obtaining the prescription value T from the formula "S+C/2", suitable prescription, value T can be obtained in consideration of not only the spherical power S but also the cylindrical power C.

In this aspect, preferably wherein point yc on the principal sight line in which the spherical equivalent power D coincides with the prescription value T, exists in the distance area, and on the principal sight line in the distance area, the power deviation ΔD goes negative in the area that is nearer to other areas than the point yc.

If an aspherical surface in which astigmatism is more important, than the spherical equivalent power D, is combined with a progressive surface, the spherical equivalent power D is changed reversely to a direction of a power shift toward the periphery of the distance area. Accordingly, one point yc always exists if there is a proper amount of the shift. Power error is smallest at point yc. Since power deviation ΔD is minus in the area nearer to other area than point yc of the distance area, both of the astigmatism and the power error can be easily improved in the peripheral part of the distance area.

Preferably, the point yc is positioned within ±4 mm from the position of a distance vision measurement point positioned in the distance area, and is positioned at a point 2 mm or more away from the progressive starting point positioned at an periphery portion close to the other area in the periphery position of the distance area.

In a conventional progressive addition lens, a blur index near the progressive starting point near an optical axis is smallest. However, with this structure, the blur index is smallest near the point yc. In the case of mounting of the progressive addition lens, it is preferable to do mounting so that a circle of about 8 mm in diameter is settled in a frame, in which a distance measurement point is the center. By setting the point yc within a range of +4 mm to −4 mm from the position of the distance vision measurement point, point yc where the blur index is smallest, can be fitted into the frame when the mounting is performed by a general mounting method. Further, by setting the point yc at a position, about 2 mm or more away from the progressive starting point, the power deviation ΔD at the progressive starting point can be easily secured. Both of the astigmatism and power error in the peripheral part of the distance area can be further improved.

According to an aspect of the present invention, there is provided a progressive addition lens, including a distance area used for a distance vision, and other area different from the distance area, wherein at least one of an eyeball side surface of a wearer and an object side surface in the progressive addition lens is formed into an aspheric form, and when a prescription value T to be obtained from formula "S+C/2" expressed by a prescribed spherical power S and a cylindrical power C is plus, the area where power deviation ΔD from prescription value T of spherical equivalent power D goes positive, exists on the principal sight line in the distance area]

With this structure, when the prescription value T obtained from the formula "+C/2" is plus, conventionally, the spherical equivalent power D is away from the prescription value T to the minus side, from the progressive starting point to the peripheral part of the distance area, thus generating a great power error and generating a regular blur or more than regular blur. In this aspect, the area where the power deviation ΔD from the prescription value T is plus, exists in the distance area, and therefore even if the spherical equivalent power D changes to the negative side toward the periphery of the distance area, differences between spherical equivalent power D and prescription value T become smaller than a conventional difference in the periphery of the distance area.

In this progressive addition lens, preferably, a point yc on the principal sight line where the spherical equivalent power D coincides with the prescription value T, exists in the distance area, and preferably ΔD goes positive on the principal sight line of the distance area, in the area that is nearer to other areas than point yc According to this structure, the power error at point yc is smallest. Since the power deviation ΔD is plus in the area nearer to other area than point yc in the distance area, both of the astigmatism and the power error can be easily improved in the peripheral part of the distance area.

Preferably, the point yc is positioned within ±4 mm from the position of a distance vision measurement point positioned in the distance area, and is positioned at a point 2 mm or more away from the progressive starting point positioned at an periphery portion close to the other area in the periphery portion of the distance area.

Thus, by setting the point yc in the rage of +4 mm to −4 mm from the position of the distance vision measurement point, for example when mounting is performed by a general mounting method, point yc where the blur index is smallest, can be fitted into the frame. Also, by setting the point yc at a point 2 mm or sore away from the progressive starting point, the power deviation ΔD at the progressive starting point can be easily secured. Both of the astigmatism and power error in the peripheral part of the distance area can be farther improved.

In this progressive addition lens, an absolute value of the power deviation ΔD is preferably set to less than 0.25 dioptre.

Namely, when the prescription value T obtained from the formula "S+C/2" is minus, the deviation (called power deviation ΔD hereafter) of the spherical equivalent power D from the prescription value T is preferably set to less than 0.25 dioptre in the negative direction, and when the prescription value T is plus, the power deviation ΔD is preferably set to less than 0.25 in the positive direction. Thus, generation of blur caused by the difference of the spherical equivalent power D with respect to the prescription value T can be suppressed within a certain range.

In most of the present progressive addition lenses, the prescription for the spherical power S and the cylindrical power C is sorted at 0.25 dioptre pitch, for responding to a request of a prescription side to provide a sufficiently suitable visual acuity for a wearer in consideration of a precision of optometry and the production error of a spectacle lens defined by ISO standard. By setting the power deviation ΔD to less than 0.25 dioptre, the progressive addition lens can be manufactured in the same way as conventional.

Namely, the conventional method can be utilized, because the pitch is matched with the pitch of the conventional progressive addition lens in which the prescription for the spherical power S and the cylindrical power C is sorted at 0.25 dioptre pitch.

In this progressive addition lens, preferably the eyeball side surface is formed into the aspheric form, and the progressive surface is formed so that a dioptric power is progressively changed from the distance area to the other area, and the object side surface is formed into a spherical surface shape.

With this structure, an outer surface curve (curvature) is fixed, and therefore a generation factor of swing or distortion is reduced, and therefore an optical performance can be improved.

DETAILED DESCRIPTION OF THE INVENTION

An embodiment of the present invention will be described based on the drawings.

Figure 1:
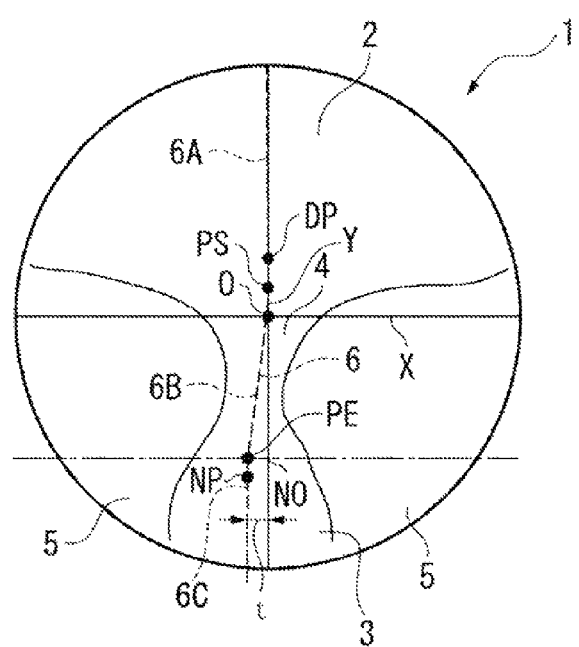
FIG. 1 is a schematic planar view of a progressive addition lens designed in an embodiment of the present invention.

FIG. 1 is a schematic planar view of a progressive addition lens according to this embodiment.

In FIG. 1, a progressive addition lens 1 is a spectacle lens including a distance area 2 provided in an upper part responding to a distance vision, a near area 3 provided in a lower part responding to a near vision, a progressive area 4 provided at an intermediate position in which a dioptric power is progressively changed from the distance area 2 to the near area 3, and intermediate portions 5 provided at both sides of the progressive area 4 respectively. Note that FIG. 1 shows the progressive addition lens 1 for a right eye.

A principal sight line 6 is provided approximately in approximately a center of the distance area 2, the progressive area 4 and the near area 3, which is a virtual line on a lens where a sight line is passed through when a spectacle wearer views a certain object positioned an a front lower side from a front upper side.

The principal sight line S is also called a main meridian, composed of a distance vision line 6A passing through the distance area 2, a progressive line 6B passing through the progressive area 4, and a near vision line 6C passing through the near area 3.

The distance vision line 6A is formed along a vertical direction when wearing spectacles lens, passing through a distance vision measurement point DP which is a center of a distance vision measurement area on which a dioptric power is added in the distance area 2. A progressive starting point PS is provided at a position away from the distance vision measurement point DP to some extent to a lower side. In the progressive addition lens 1 of this embodiment, the progressive starting point PS coincides with an eye point. The eye point (fitting point) is a point as a reference for positioning when framing the spectacle lens.

A line segment extending to the near area 3 from the progressive starting point PS including the distance vision line 6A is set as Y-axis, and a line segment orthogonal to the Y-axis and extending in a horizontal direction is set as X-axis. A length of the line segment from the progressive starting point PS to the progressive end point PE, which is the length of the line segment projected to the Y-axis, is a progressive zone length. Original point O of the Y-axis is a prism measurement point O. The prism measurement point is a reference point for determining a prism action of a lens.

The near vision line 6C is formed along the vertical direction when, wearing spectacles, passing through the near vision measurement point NP, and is inset toward a nose side (left side in FIG. 1) by dimension t from the Y-axis.

The progressive line 6B is the line segment for connecting a lower end of the distance vision line 6A and an upper end of the near vision line 6C, and is formed obliquely to the distance vision line 6A and the near vision line 6C. A connection point of the near vision line 6C and the progressive line 6B is a progressive end point PE, and the near vision measurement point NP is provided at a position lower to some extent than the progressive end point PE.

The distance area 2, the near area 3, and the progressive area 4 are formed on an inner surface (eyeball side) of the progressive addition lens 1, and a spherical surface is formed on an outer surface (object side) of the progressive addition lens 1.

In this embodiment, an aspherical design is applied to the inner surface of the progressive addition lens 1 for reducing astigmatism.

In this embodiment, a toric surface is set for correcting distorted vision, and a design method is for example disclosed in WO097/13382, wherein the method for designing a combined refractive surface combining the toric surface and a progressive refractive surface is disclosed for example.

In this embodiment, an aspherical surface addition is minutely calculated for the distance area 2 and the near area 3, to thereby obtain an optimal aspherical surface addition. Therefore, a first reference line is set so as to extend in at least two directions of a radiating direction from a center point near a geometrical center of a lens in the distance area 2, for example from the prism measurement point O, and a second reference line is set so as to extend in at least one direction of the radiating direction from the center point in the near area 3, and the ashperical surface addition for a dioptric power along each reference line, is determined. Then, the aspherical surface addition for the dioptric power between these reference lines, is determined by interpolation. The aspherical surface addition for the dioptric power of the combined refractive surface along each reference line is determined in each reference line, under the same condition as the as-worn condition, and using a publicly-known method of calculating power, astigmatism, and prism, etc., by ray-tracing so that an optimal aspherical surface addition can be obtained.

For example, when a horizontal line segment passing through a geometric center of the lens is defined as A-axis, and a vertical line segment is defined as B-axis, and a depth direction of the lens is defined as C-axis, and a point where each reference line is crossed each other is defined as a coordinate system expressed by $(A, B, C)=(0, 0, 0)$ (original point), coordinate $C_p$ in a depth direction of the combined refractive surface is expressed by a function of coordinate $(A, B)$ like $C_p=f(A, B)$. When aspherical surface addition $\delta$ in the C-axis direction is added to the coordinate $C_p$, $C_t=C_p+\delta$ is established, wherein a combined coordinate in the C-axis direction after adding aspherical surface addition $\delta$, namely, the coordinate of a new combined refractive surface is defined as $C_t$. In this case, there is less prism and less generation of astigmatism near the center point of the lens, and therefore the aspherical surface addition may be small. However, an angle is formed in a light beam incident on the eye in the lens peripheral part, and therefore astigmatism is easily generated, thus increasing the aspherical surface addition for correcting the astigmatism. An actually added ideal aspherical surface addition is changed according to a distance from, the center point.

In this embodiment, power setting in the near area 3 is performed as conventional, and meanwhile power setting in the distance area 2 is different from conventional setting.

A method of setting a specific spherical equivalent power in the distance area 2 will be described based on an example.

EXAMPLE

In each example described below, the progressive addition lens 1 with an outer surface formed into a spherical surface, an inner surface formed into a progressive surface, and having an aspheric form, is provided, in which refractive index n is 1.662, and a progressive zone length is 14 mm.

In FIG. 1, the progressive starting point PS and the fitting point. (X, Y)=(0.4 mm), and the progressive end point PE (X, Y)=(−2, 5 mm, −10 mm), and the distance vision measurement point DP (X, Y)=(0, 8 mm), and the near vision measurement point NP (X, Y)=(−2.5 mm, −13 mm), and the prism measurement point O (X, Y)=(0, 0). A pantoscopic lens tilt is 6 degrees.

Example 1

In example 1, an outer surface curve is 2.50 dioptre, and a thickness of a lens center is 1.1 mm.

Prescription is as follows: spherical power S is −5.00 dioptre, and addition ADD is 2.50 dioptre. Cylindrical power is not set in example 1.

In the prescription value T obtained from the formula "S+C/2" expressed by the prescribed spherical power S and the cylindrical power C, T=−5.00+0=−5.00. Namely, example 1 provides a minus lens in which the prescription value T is minus.

Figure 2:
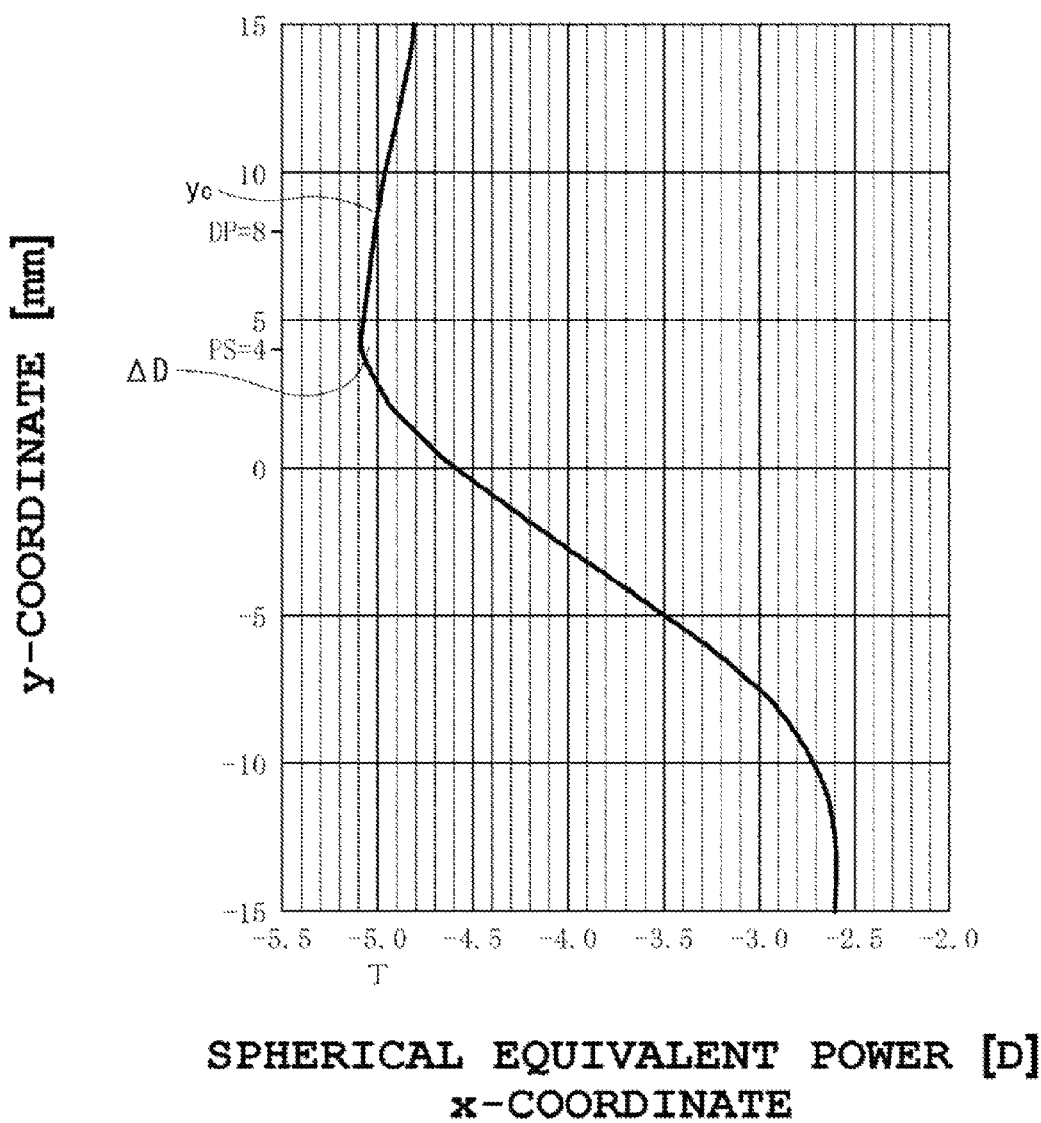
FIG. 2 is a graph showing a relation between a spherical equivalent power and y-coordinate in example 1.

In example 1, as shown in the graph of FIG. 2, the as-worn spherical equivalent power D was set.

FIG. 2 is a graph showing a relation between the x-coordinate indicating the as-worn spherical equivalent power D and the y-coordinate according to example 1. The y-coordinate of FIG. 2 corresponds to the Y-axis of FIG. 1. Namely, in the y-coordinate of FIG. 2, O is the same as O of the Y-axis, and a numerical value of the y-coordinate is the same as the numerical value of the Y-axis. For example, the position of 4 mm in the y-coordinate is the position on the Y-axis of the progressive starting point PS, and the position of −10 mm in the y-coordinate is the position on the Y-axis of the progressive end point PS. An area of 4 mm or more which is the position of the progressive starting point PS, is in the distance area. The as-worn spherical equivalent power D in each y-coordinate is the spherical equivalent power D of the optical beam passing through the position on each Y-axis on the lens and passing through a rotation center of an eye of a wearer.

In example 1, the power deviation $\Delta D$ of the spherical equivalent power D from the prescription value T positioned in the distance area 2, is set to be shifted to the minus side of the prescription value T, so that the area of minus power deviation $\Delta D$ is included in a part of the distance area 2. Namely, in a range where the y-coordinate is 4 mm or more and 8 mm or less, the spherical equivalent poser D is set so that the area in which the spherical equivalent power D is smaller than −5.00 dioptre is included in the distance area 2, and when the y-coordinate exceeds 8 mm, the spherical equivalent power D is shifted to the plus side of the prescription value T.

For example, the coordinate (x, y) is (−5.09 dioptre, 4 mm) at the position of the progressive starting point PS where the y-coordinate is 4 mm, and the coordinate (x, y) is (−5.02 dioptre, 8 mm) at the position where the y-coordinate is 8 mm, and (x, y) is (−4.89 dioptre, 12 mm) at the position where the y-coordinate is 12 mm. In FIG. 1, the power deviation $\Delta D$ is −0.1 dioptre or less at maximum.

Further, in the area where the y-coordinate is larger than the progressive starting point PS in the distance area 2, there is the point yc where the spherical equivalent power D is the same value as the prescription value T, and the coordinate (x, y) of this point yc is (−5.00 dioptre, 8 mm). The position of the point yc with respect to the progressive starting point PS is 4 mm, and the position of the point yc with respect to the distance vision measurement point DP is 0 mm (the same position).

Figure 3:
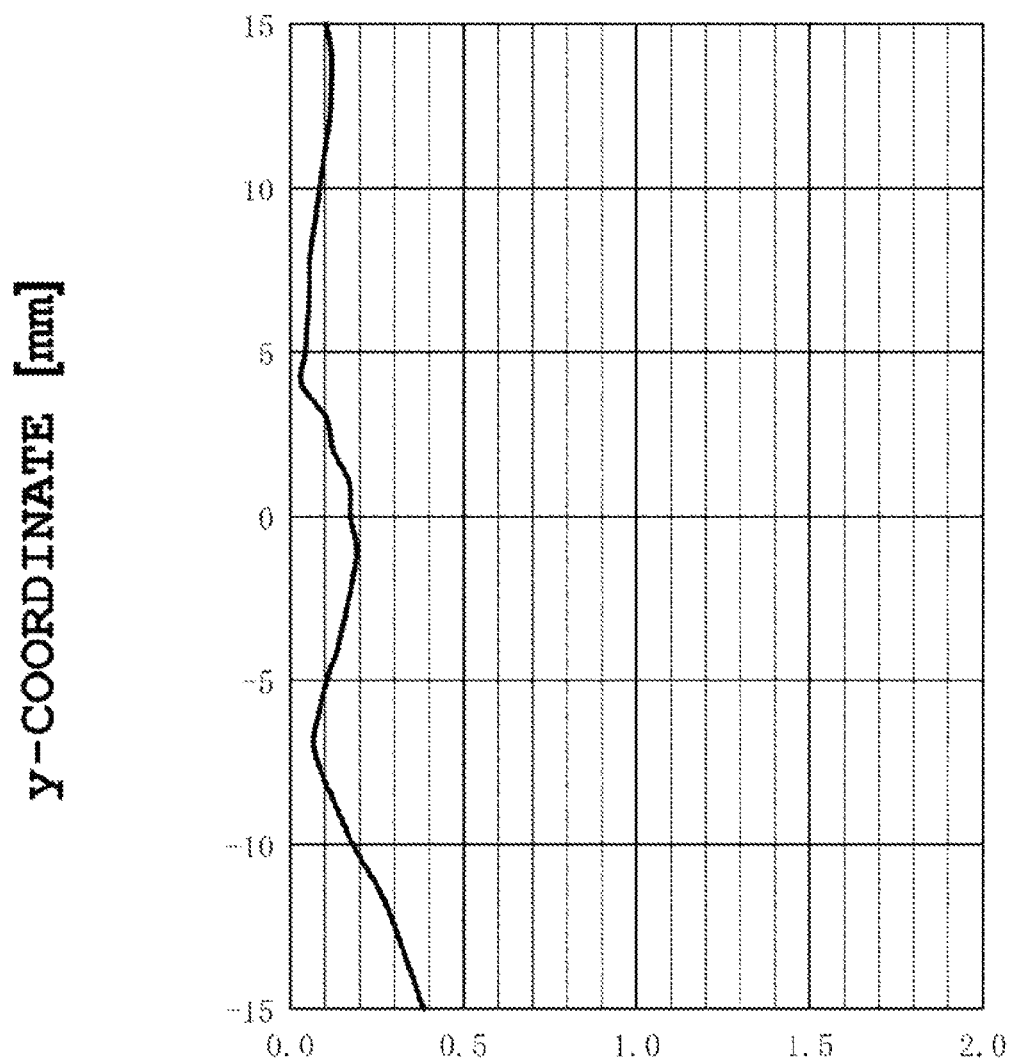
FIG. 3 is a graph showing a relation between astigmatism and the y-coordinate in example 1.

FIG. 3 is a graph showing the relation between astigmatism and the y-coordinate.

In FIG. 3, astigmatism in the distance area 2 is 0.11 dioptre at maximum. For example, astigmatism is 0.02 dioptre when the y-coordinate is 4 mm, and astigmatism is 0.05 dioptre when the y-coordinate is 8 mm, and astigmatism is 0.10 dioptre when the y-coordinate is 12 mm.

Wherein, explanation is given for the blur index as a reference of evaluating the example.

The blur index indicates a degree of blurring caused by the power error and the astigmatism when wearing the lens. It is difficult to objectively judge whether or not the blurring occurs, depending on magnification of a lens or sensitivity of an individual person. However, as-worn resolution, is likely to drop, as the blur index becomes larger.

When a point light source is viewed through a lens, an image is formed on retina, in an appearance of not a point but a circle or an oval shape. Such a circle is called a blur circle, and an index corresponding to a length of a diagonal line of a rectangle that circumscribes the blur circle, is the blur index. Namely, in the blur circle (oval shape), when the length of a long axis is defined as a, and the length of a short axis is defined as b, the blur index is the length $(a^2+b^2)^{1/2}$ of the diagonal line of the blur circle. In example 1, the blur index was calculated under a condition that infinite distance is viewed in an unadjusted state.

Figure 4:
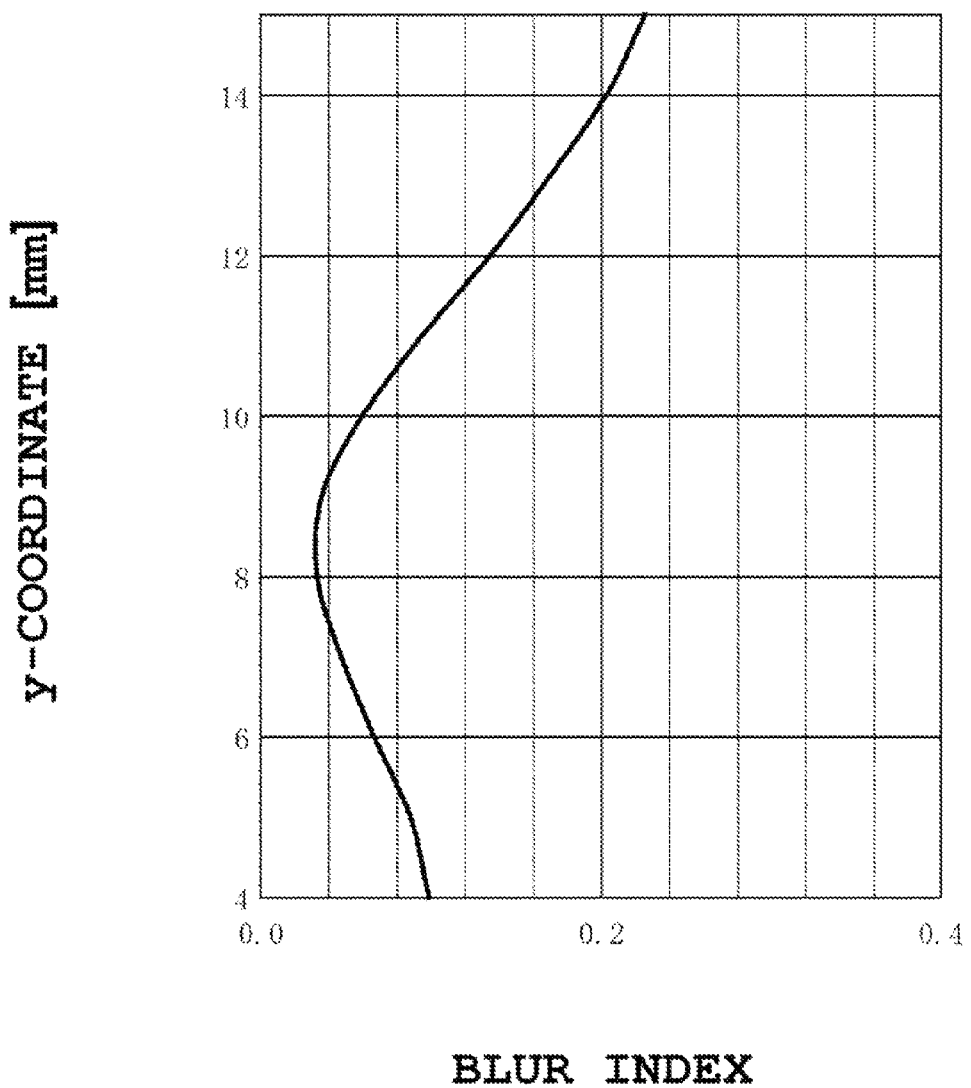
FIG. 4 is a graph showing a relation between a blur index and the y-coordinate in example 1.

The relation between the blur index and the y-coordinate according to example 1 is shown in FIG. 4.

In FIG. 4, it is found that the blur index is 0.10 when the y-coordinate is 4 mm, and the blur index is 0.04 when the y-coordinate is 8 mm, and the blur index is 0.13 when the y-coordinate is 12 mm. It is found from FIG. 4 that the blur index is smallest at a point near the point yc, and is relatively a large value at a peripheral periphery portion of the distance area 2.

Example 2

In example 2, the outer surface curve is 1.00 dioptre and the thickness of the lens center is 1.1 mm.

Prescription is as follows: spherical power is −8.00 dioptre, and addition ADD is 2.50 dioptre. In example 2, the cylindrical power is not set.

the prescription value T obtained from the formula "S+C/2" expressed by the prescribed spherical power S and the cylindrical power C is as follows: T=−8.00+0=−8.00. Namely, example 2 shows a minus lens with minus prescription value T.

Figure 5:
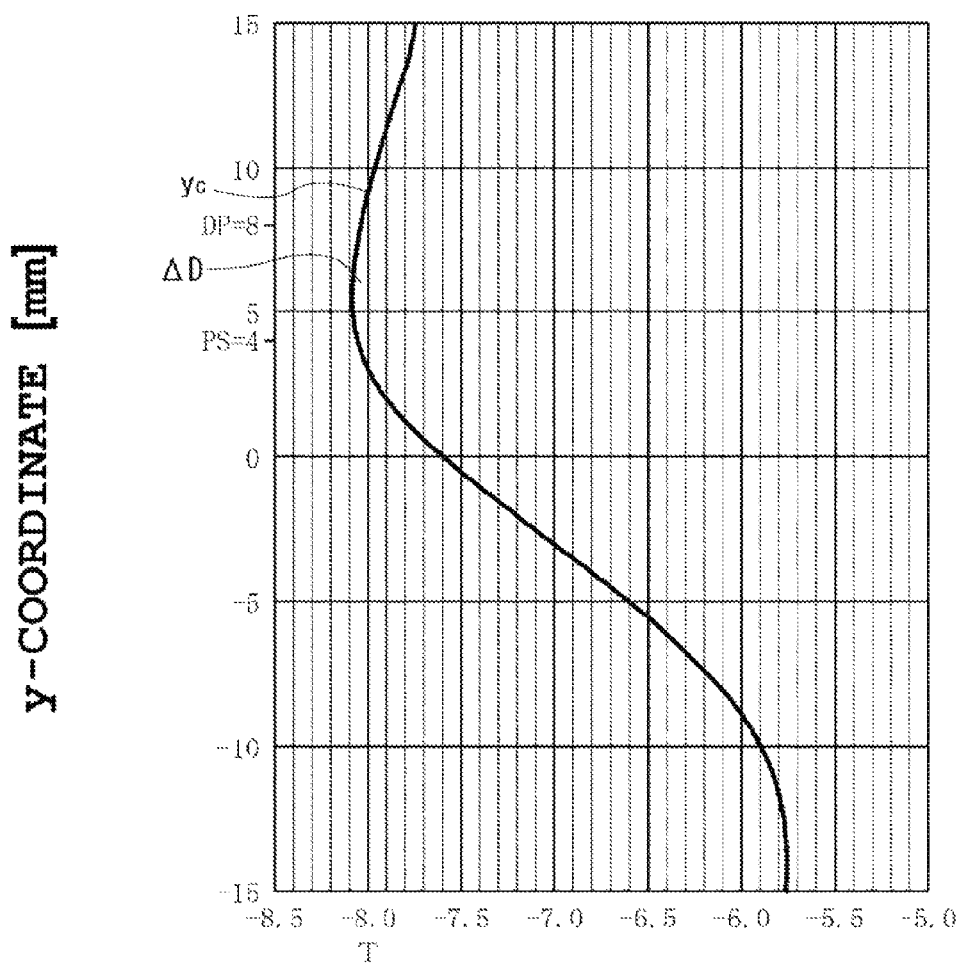
FIG. 5 is a graph showing a relation between spherical equivalent power and the y-coordinate in example 2.

In example 2, as shown in the graph of FIG. 5, the as-worn spherical equivalent power was set.

FIG. 5 is the graph showing the relation between the x-coordinate showing the as-worn spherical equivalent power D, and the y-coordinate.

In example 2, the power deviation ΔD of the spherical equivalent power D from the prescription value T positioned in the distance area 2, is set to be shifted to the minus side of the prescription value T, so that the area of minus power deviation ΔD is included in a part of the distance area 2. Namely, in a range where the y-coordinate is 4 mm or more and 9 mm or less, the spherical equivalent power D is set so that the minus side area where the spherical equivalent power D is shifted to the minus side from −8.00 is included in the distance area 2, and when the y-coordinate exceeds 9 mm, the spherical equivalent power D is shifted to the plus side of the prescription value T.

For example, the coordinate (x, y) is (−8.06 dioptre, 4 mm) at the position of the progressive starting point where the y-coordinate is 4 mm, and coordinate (x, y) is (−8.04 dioptre, 8 mm) at the position where the y-coordinate is 8 mm, and (x, y) is (−7.87 dioptre, 12 mm) at the position where the y-coordinate is 12 mm. In FIG. 5, the power deviation ΔD is −0.1 dioptre or less at maximum.

Further, in the area where the y-coordinate is larger than the progressive starting point PS in the distance area 2, there is the point yc where the spherical equivalent power D is the same value as the prescription value T, and the coordinate (x, y) of this point yc is (−8.00 dioptre, 9 mm). The position of the point yc with respect to the progressive starting point PS is 5 mm, and the position of the point yc with respect to the distance vision measurement point DP is 1 mm.

Figure 6:
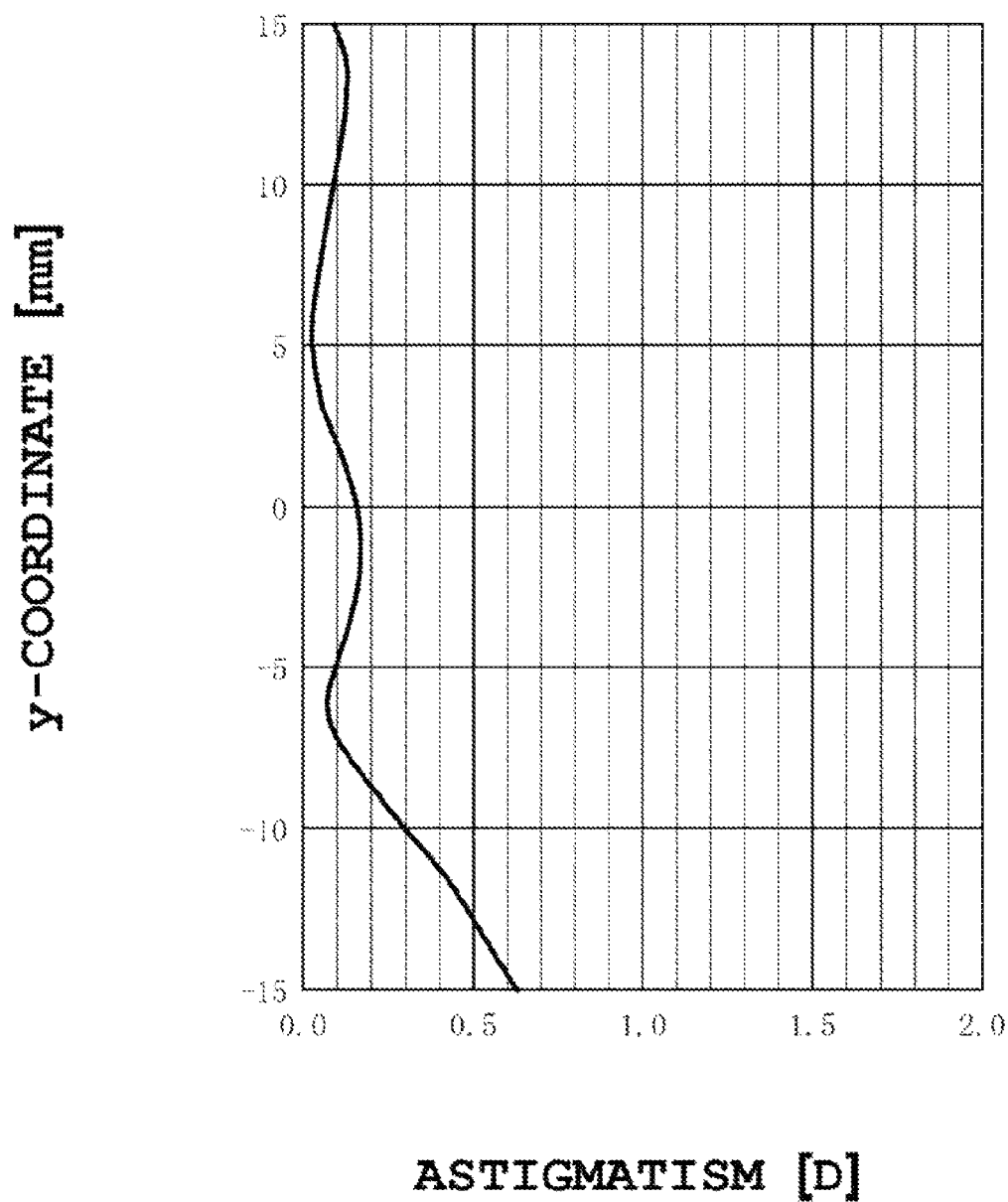
FIG. 6 is a graph showing a relation between the astigmatism and the y-coordinate in example 2.

FIG. 6 is a graph showing the relation between the astigmatism and the y-coordinate according to example 2.

In FIG. 6, the astigmatism in the distance area 2 is 0.11 dioptre at maximum. For example, the astigmatism is 0.02 dioptre when the y-coordinate is 4 mm, the astigmatism is 0.04 dioptre when the y-coordinate is 8 mm, and the astigmatism, is 0.10 dioptre when the y-coordinate is 12 mm.

Figure 7:
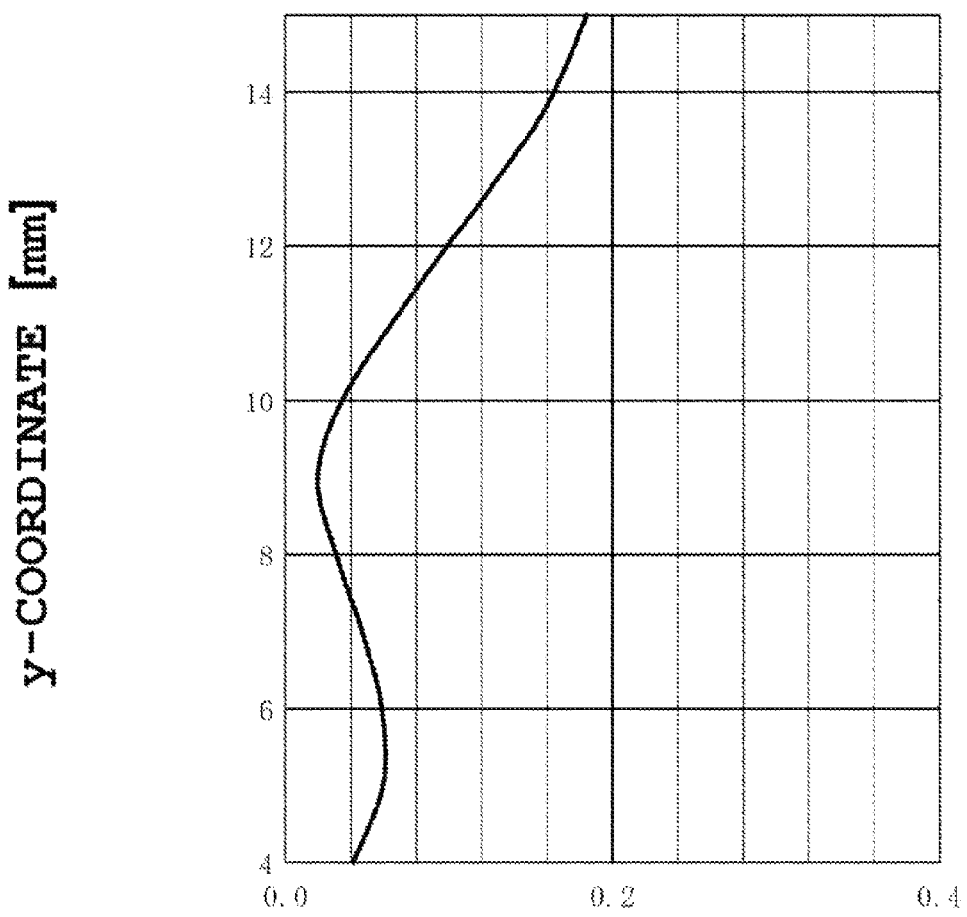
FIG. 7 is a graph showing a relation between the blur index and the y-coordinate in example 2.

The relation between the blur index and the y-coordinate according to example 2 is shown in FIG. 7.

In FIG. 7, the blue index is 0.04 when the y-coordinate is 4 mm, and the blur index is 0.03 when the y-coordinate is 8 mm, and the blur index is 0.10 when the y-coordinate is 12 mm. The blur index is smallest at a point near the point yc, and is relatively a large value at the peripheral periphery portion of the distance area 2.

Example 3

In example 3, the outer surface curve is 2.50 dioptre, and the thickness of the lens center is 1.1 mm.

The prescription is as follows: Spherical power S is −5.00 dioptre, cylindrical power C is −2.00 dioptre, astigmatic axis is 45 degrees, and addition power ADD is 2.50 dioptre.

The prescription value T obtained from the formula "S+C/2" expressed by the prescribed spherical power S and the cylindrical power C is as follows: T=−5.00+(−2.00/2)=−6.00. Namely, example 2 shows the minus lens with minus prescription value T.

Figure 8:
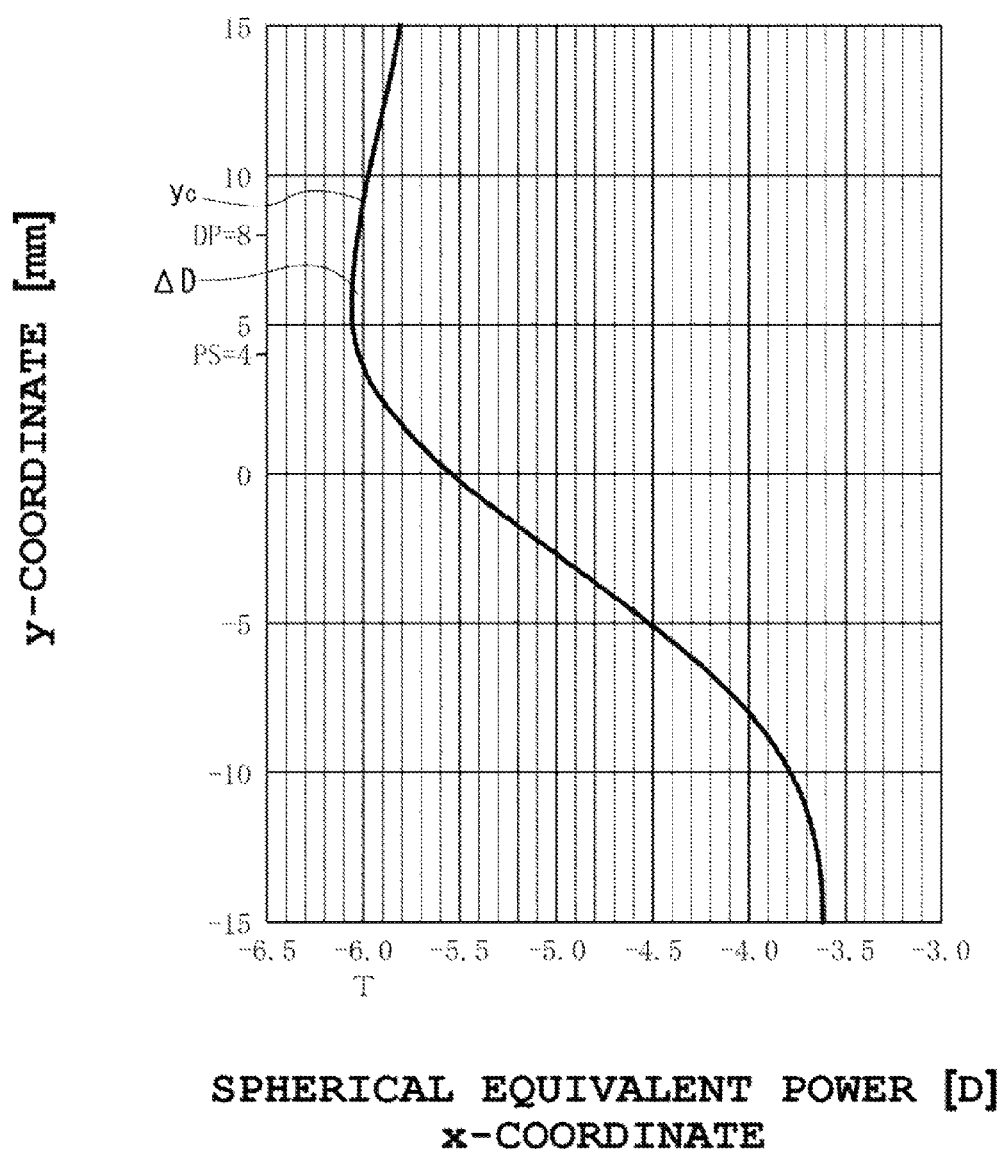
FIG. 8 is a graph showing a relation between the spherical equivalent power and the y-coordinate in example 3.

In example 3, as shown in the graph of FIG. 8, the as-worn spherical equivalent power was set.

FIG. 8 is a graph showing the relation between the x-coordinate showing the as-worn spherical equivalent power D and the y-coordinate according to example 3.

In example 3, the power deviation ΔD of the spherical equivalent power D from the prescription value T positioned in the distance area 2, is set to be shifted to the minus side of the prescription value T, so that the area of minus power deviation ΔD is included in a part, of the distance area 2. Namely, in the range where the y-coordinate is 4 mm or more and 9 mm or less, the spherical equivalent power D is set so that the minus side area where the spherical equivalent, power D is shifted to the minus side from −6.00 is included in the distance area 2, and when the y-coordinate exceeds 9 mm, the spherical equivalent power D is set be the plus side of the prescription value T.

For example, coordinate (x, y) is (−6.02 dioptre, 4 mm) at the position of the progressive starting point where the y-coordinate is 4 mm, and coordinate (x, y) is (−6.03 dioptre, 8 mm) at the position where the y-coordinate is 8 mm, and (x, y) is (−5.09 dioptre, 12 mm) at the position where the y-coordinate is 12 mm. In FIG. 8, the power deviation ΔD is −0.08 dioptre or less at maximum.

Further, in the area where the y-coordinate is larger than the progressive starting point PS in the distance area 2, there is the point yc where the spherical equivalent power D is the same value as the prescription value T, and the coordinate (x, y) of this point yc is (−6.00 dioptre, 9 mm). The position of the point yc with respect to the progressive starting point PS is 5 mm, and the position of the point yc with respect to the distance vision measurement point DP is 1 mm.

Figure 9:
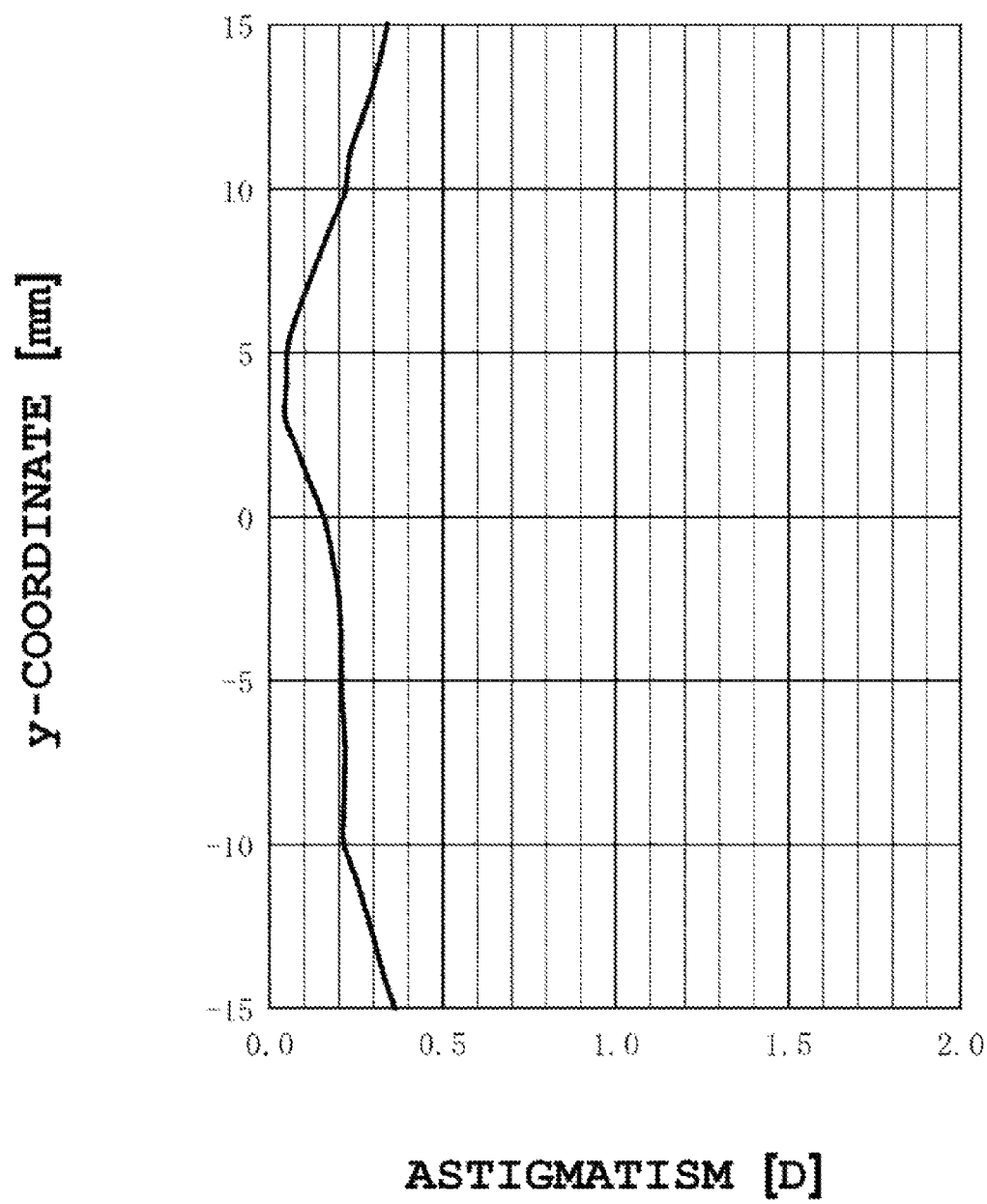
FIG. 9 is a graph showing a relation between astigmatism and the y-coordinate in example 3.

FIG. 9 is the graph showing the relation between the astigmatism and the y-coordinate according to example 3.

In FIG. 9, the astigmatism in the distance area 2 is 0.32 dioptre at maximum. Astigmatism is 0.02 dioptre when the y-coordinate is 4 mm, and astigmatism is 0.13 dioptre when the y-coordinate is 8 m, and astigmatism is 0.24 dioptre when the y-coordinate is 12 mm.

Figure 10:
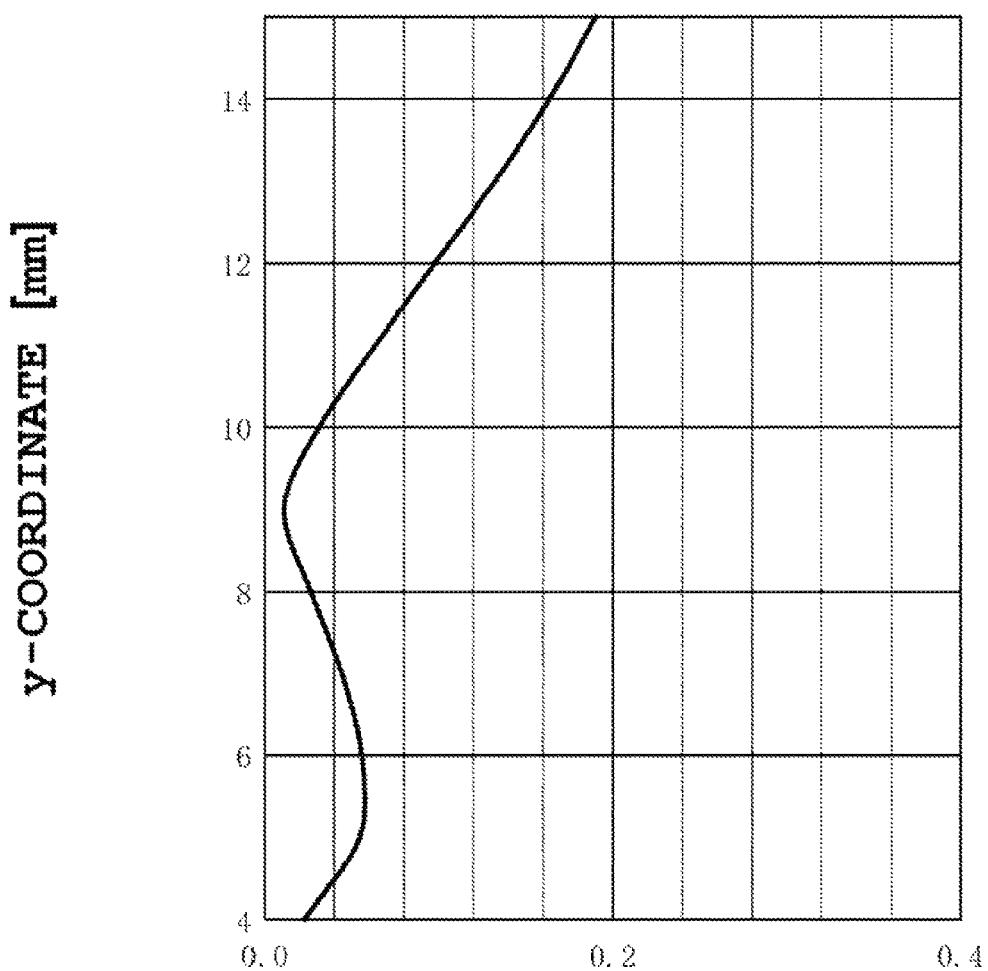
FIG. 10 is a graph showing a relation between the blur index and the y-coordinate in example 3.

The relation between the blue index and the y-coordinate according to example 3 is shown in FIG. 10.

In FIG. 10, the blur index is 0.02 when the y-coordinate is 4 mm, and the blue index is 0.03 when the y-coordinate is 8 mm, and the blur index is 0.10 when the y-coordinate is 12 mm. It is found that the blur index is smallest at a point near the point yc, and is relatively a large value at the peripheral periphery portion of the distance area 2.

Example 4

In example 4, the outer surface curve is 7.00 dioptre, and the thickness of the lens center is 4.1 mm.

The prescription is as follows: the spherical power S is +4.50 dioptre, and the addition ADD is 1.50 dioptre. In example 4, the cylindrical power is not set.

The prescription value T obtained from the formula "S+C/2" expressed by the prescribed spherical power S and the cylindrical power C is as follows: T−+4.50+0=+4.50. Namely, example 4 shows a plus lens with plus prescription value T.

Figure 11:
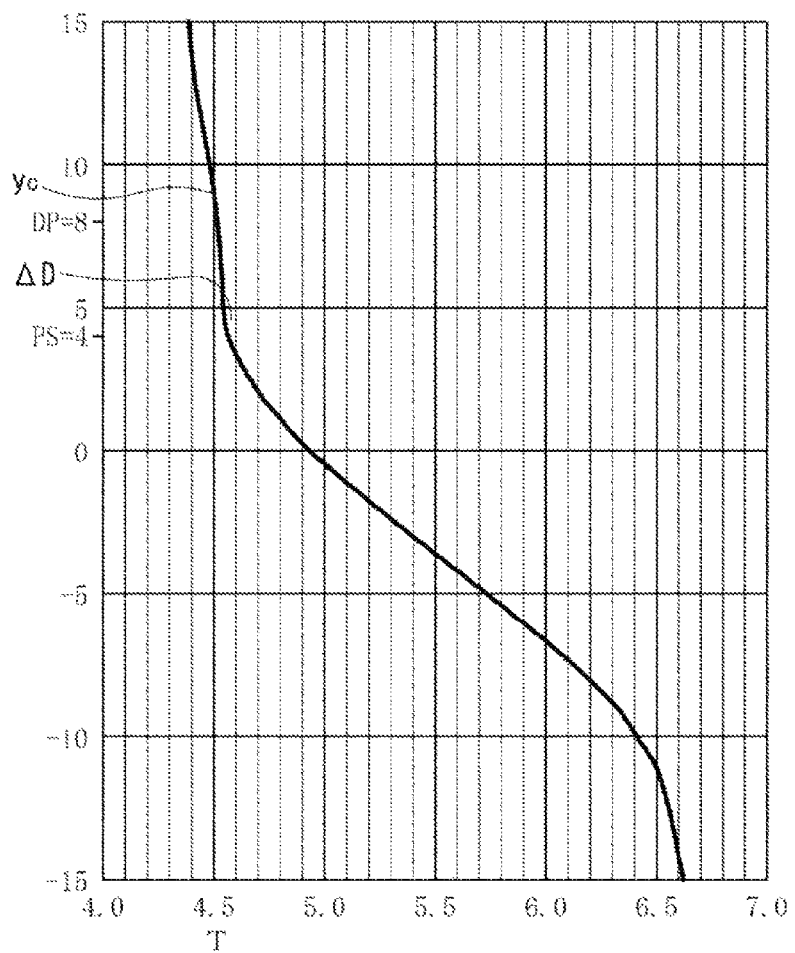
FIG. 11 is a graph showing a relation between the spherical equivalent power and the y-coordinate in example 4.

In example 4, as shown in the graph of FIG. 11, the as-worn spherical equivalent power D was set.

FIG. 11 is a graph showing the relation between the x-coordinate showing the as-worn spherical equivalent power D and the y-coordinate according to example 4.

In example 4, the power deviation ΔD of the spherical equivalent power D from the prescription value T positioned in the distance area 2, is set to be shifted to the plus side of the prescription value T, so that the area of plus power deviation ΔD is included in a part of the distance area 2. Namely, in the range where the y-coordinate is 4 mm or more and 7 mm or less, the spherical equivalent power D is set so that the area in which the spherical equivalent power D is shifted to the plus side from +4.5 is included in the distance area 2, and when the y-coordinate exceeds 9 mm, the spherical equivalent power D is shifted to the minus side of the prescription value T.

For example, the coordinate (x, y) is (4.56 dioptre, 4 mm) at the position of the progressive starting point where the y-coordinate is 4 mm, and the coordinate (x, y) is (4.51 dioptre, 8 mm) at the position where the y-coordinate is 8 mm, and (x, y) is (4.43 dioptre, 12 mm) at the position where the y-coordinate is 12 mm. In FIG. 11, the power deviation OD is −0.06 dioptre or less at maximum.

Further, in the area where the y-coordinate is larger than the progressive starting point PS in the distance area 2, there is the point yc where the spherical equivalent power D is the same value as the prescription value T, and the coordinate (x, y) of this point yc is (4.5 dioptre, 9 mm). The position of the point yc with respect to the progressive starting point PS is 5 mm, and the position of the point yc with respect to the distance vision measurement point DP is 1 mm.

Figure 12:
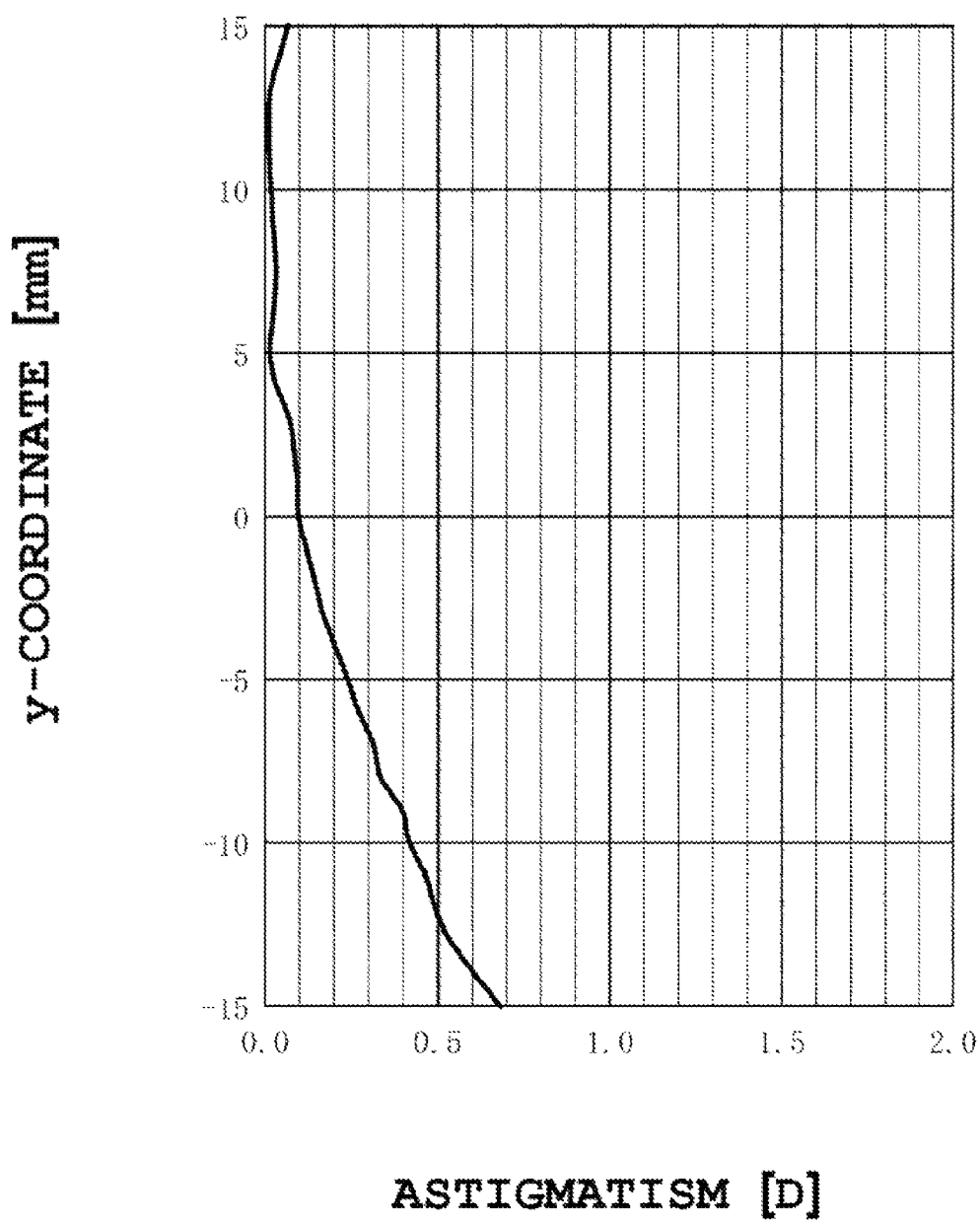
FIG. 12 is a graph showing a relation between the astigmatism and the y-coordinate in example 4.

FIG. 12 is a graph showing the relation between the astigmatism and the y-coordinate according to example 4.

In FIG. 12, the astigmatism in the distance area 2 is 0.06 dioptre at maximum. For example, the astigmatism is 0.02 dioptre when the y-coordinate is 4 mm, and the astigmatism is 0.02 dioptre when the y-coordinate is 8 mm, and the astigmatism is 0.00 dioptre when the y-coordinate is 12 mm.

Figure 13:
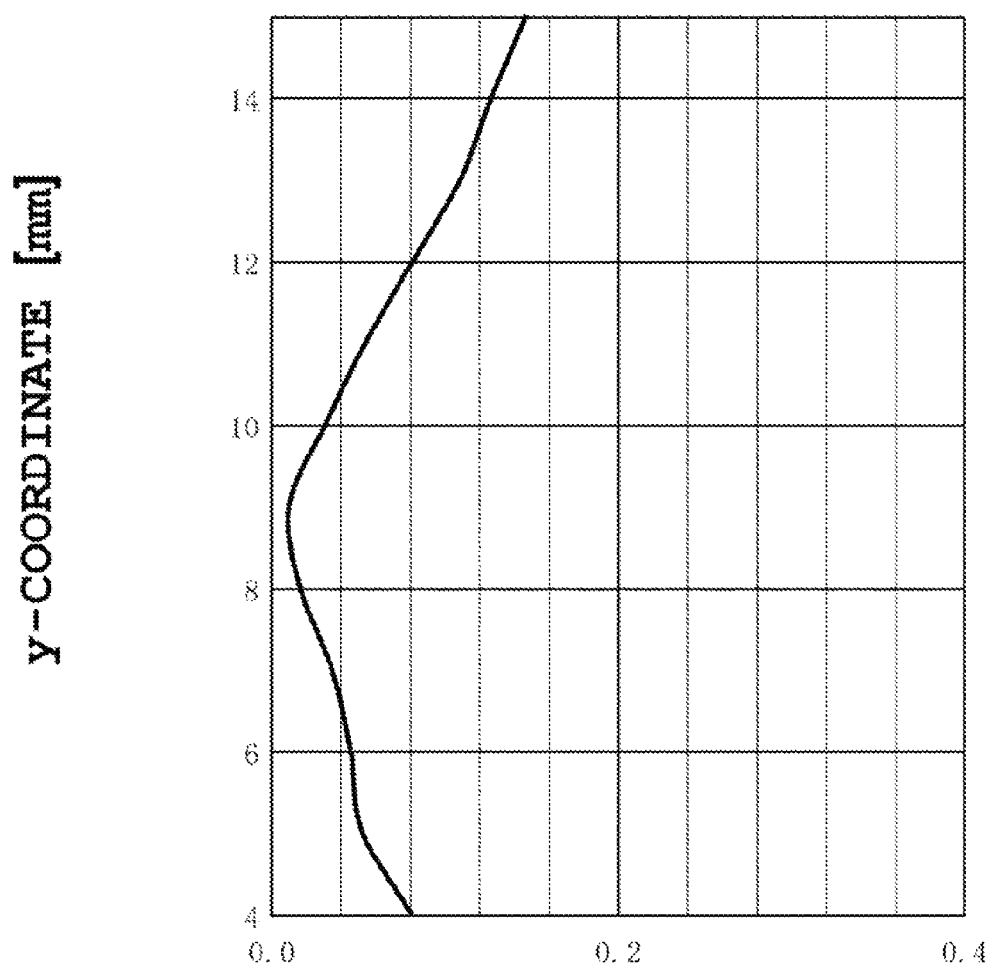
FIG. 13 is a graph showing a relation between the blur index and the y-coordinate in example 4.

The relation between the blur index and the y-coordinate according to example 4 is shown in FIG. 13.

In FIG. 13, the blur index is 0.08 when the y-coordinate is 4 mm, and the blur index is 0.02 when the y-coordinate is 8 mm, and the blur index is 0.08 when the y-coordinate is 12 mm. It is found that the blur index is smallest at a point near the point yc, and is relatively a large value at the peripheral periphery portion of the distance area 2.

Example 5

In example 5, the outer surface curve is 5.00 dioptre, and the thickness of the lens center is 3.3 mm.

The prescription is as follows: Spherical power S is +3.00 dioptre, the addition ADD is 1.50 dioptre. In example 5, the cylindrical power is not set.

The prescription value T obtained from the formula "S+C/2" expressed by the prescribed spherical power S and the cylindrical power C is as follows: T=+3.00+0=+3.00. Namely, example 5 shows the plus lens with plus prescription value T.

Figure 14:
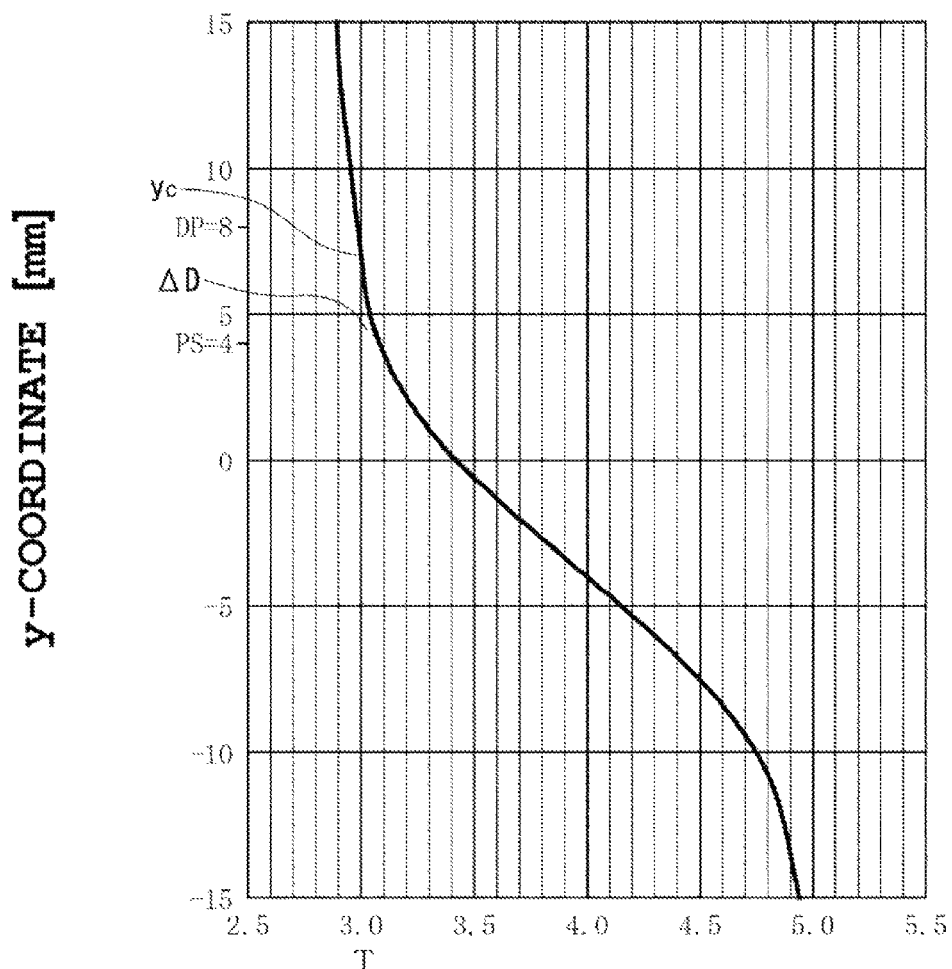
FIG. 14 is a graph showing a relation between the spherical equivalent power and the y-coordinate in example 5.

In example 5, as shown in the graph of FIG. 14, the as-worn spherical, equivalent power was set.

FIG. 14 is a graph showing the relation between the x-coordinate showing the as-worn spherical equivalent power D and the y-coordinate.

In example 5, the power deviation ΔD of the spherical equivalent power D from the prescription value T positioned in the distance area 2, is set to be shifted to the plus side of the prescription value T, so that the area of plus power deviation ΔD is included in a part of the distance area. Namely, in the region where the y-coordinate is 4 mm or more and 7 mm or less, the spherical equivalent power D is set so that the plus side area where the spherical equivalent power D is shifted to the plus side from +3.0 is included in the distance area 2, and when the y-coordinate exceeds 7 mm, the spherical equivalent power D is shifted to the minus side of the prescription value T.

For example, the coordinate (x, y) is (3.08 dioptre, 4 mm) at the position of the progressive starting point PS where the y-coordinate is 4 mm, and the coordinate (x, y) is (2.99 dioptre, 8 mm) at the position where the y-coordinate is 8 mm, and (x, y) is (2.92 dioptre, 12 mm) at the position where the y-coordinate is 12 mm. In FIG. 14, the power deviation ΔD is 0.08 dioptre or less at maximum.

Further, in the area where the y-coordinate is larger than the progressive starting point PS in the distance area 2, there is the point yc where the spherical equivalent power D is the same value as the prescription value T, and the coordinate (x, y) of this point yc is (3.0 dioptre, 7 mm). The position of the point yc with respect to the progressive starting point PS is 3 mm, and the position of the point yc with respect to the distance vision measurement point DP is −1 mm.

Figure 15:
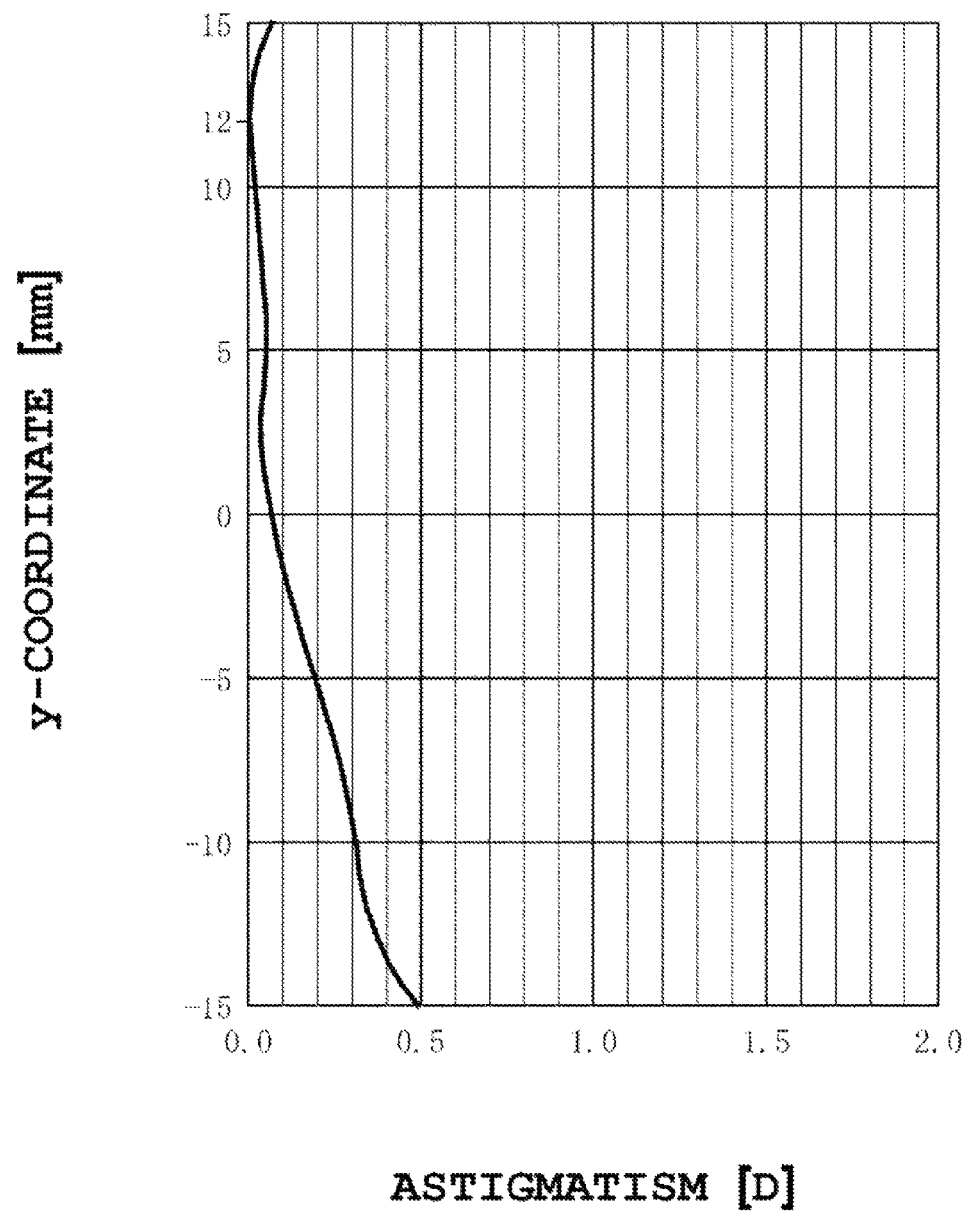
FIG. 15 is a graph showing a relation between the astigmatism and the y-coordinate in example 5.

FIG. 15 is a graph showing the relation between the astigmatism and the coordinate y according to example 5.

In FIG. 15, the astigmatism in the distance area 2 is 0.05 dioptre at maximum. For example, the astigmatism is 0.03 dioptre when the y-coordinate is 4 mm, and the astigmatism, is 0.02 dioptre when the y-coordinate is 8 mm, and the astigmatism, is 0.00 dioptre when the y-coordinate is 12 mm.

Figure 16:
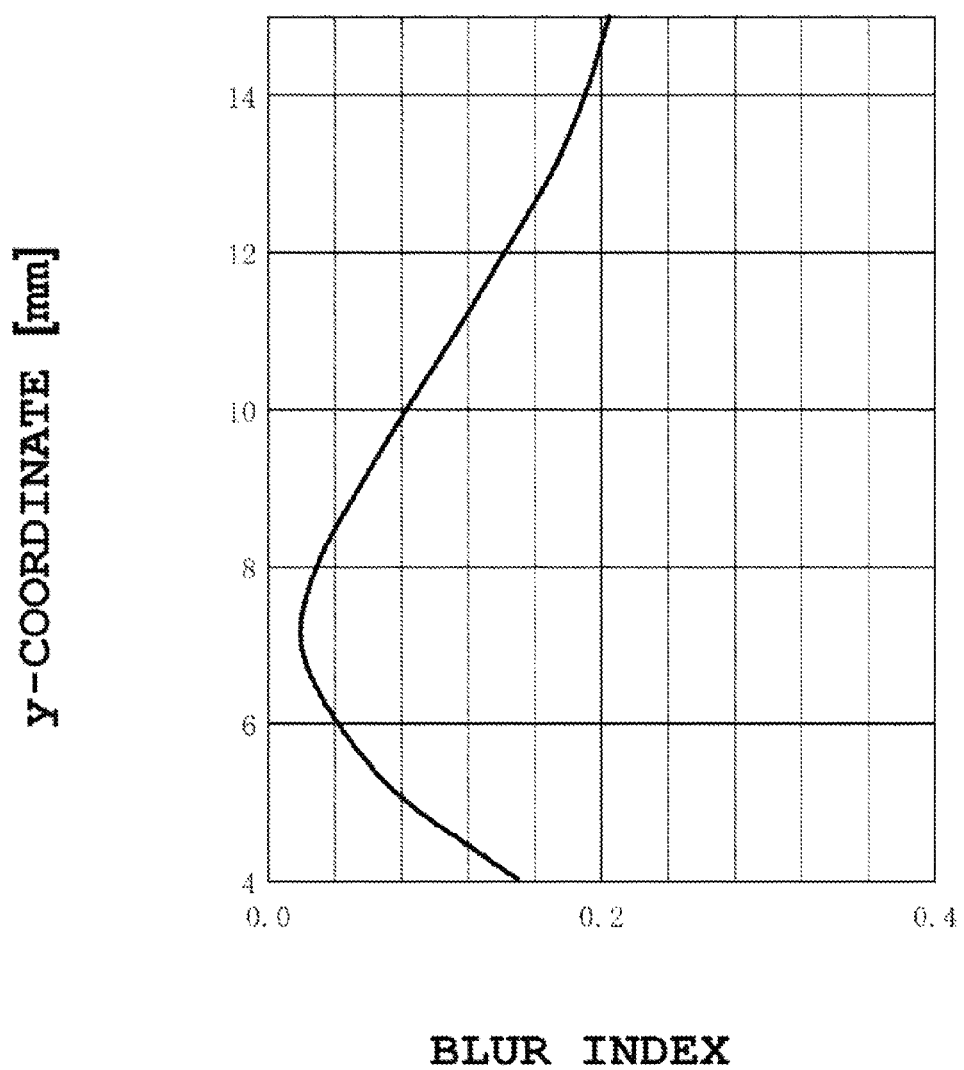
FIG. 16 is a graph showing a relation between the blur index and the y-coordinate in example 5.

The relation between the blur index and the y-coordinate according to example 5 is shown in FIG. 16.

In FIG. 16, the blur index is 0.15 when the y-coordinate is 4 mm, and the blur index is 0.03 when the y-coordinate is 8 mm, and the blur index is 0.14 when the y-coordinate is 12 mm. It is found that the blur index is smallest at a point near the point yc, and is relatively a large value at the peripheral periphery portion of the distance area 2.

Comparative Example 1

Comparative example 1 provides a conventional progressive addition lens and is the same as example 1 excluding a point that the power deviation ΔD is not set.

Namely, in comparative example 1, there is provided a progressive addition lens 1 formed into an outer spherical surface, inner progressive and aspheric form, in which a refractive index n is 1.662, and a progressive zone length is 14 mm.

The progressive starting point PS and the fitting point are (X, Y)=(0.4 mm), and progressive end point PE is (X, Y)=(−2.5 mm, −10 mm), and distance vision measurement point DP is (X, Y)=(0.8 mm), and near vision measurement point NP is (X, Y)=(−2.5 mm, −13 mm), and prism measurement point is (X, Y)=(0, 0). The as-worn pantoscopic angle is 6 degrees.

In comparative example 1, the outer surface curve is 2.50 dioptre, and the thickness of the lens center is 1.1 mm.

The prescription is as follows: the spherical power S is −5.00 dioptre, and the addition ADD is 2.50 dioptre. In comparative example 1, the cylindrical power is not set.

In the prescription value T obtained from the formula "S+C/2" expressed by the prescribed spherical power S and the cylindrical power C, T=−5.00+0=−5.00. Namely, comparative example 1 provides a minus lens in which the prescription value T is minus.

Figure 17:
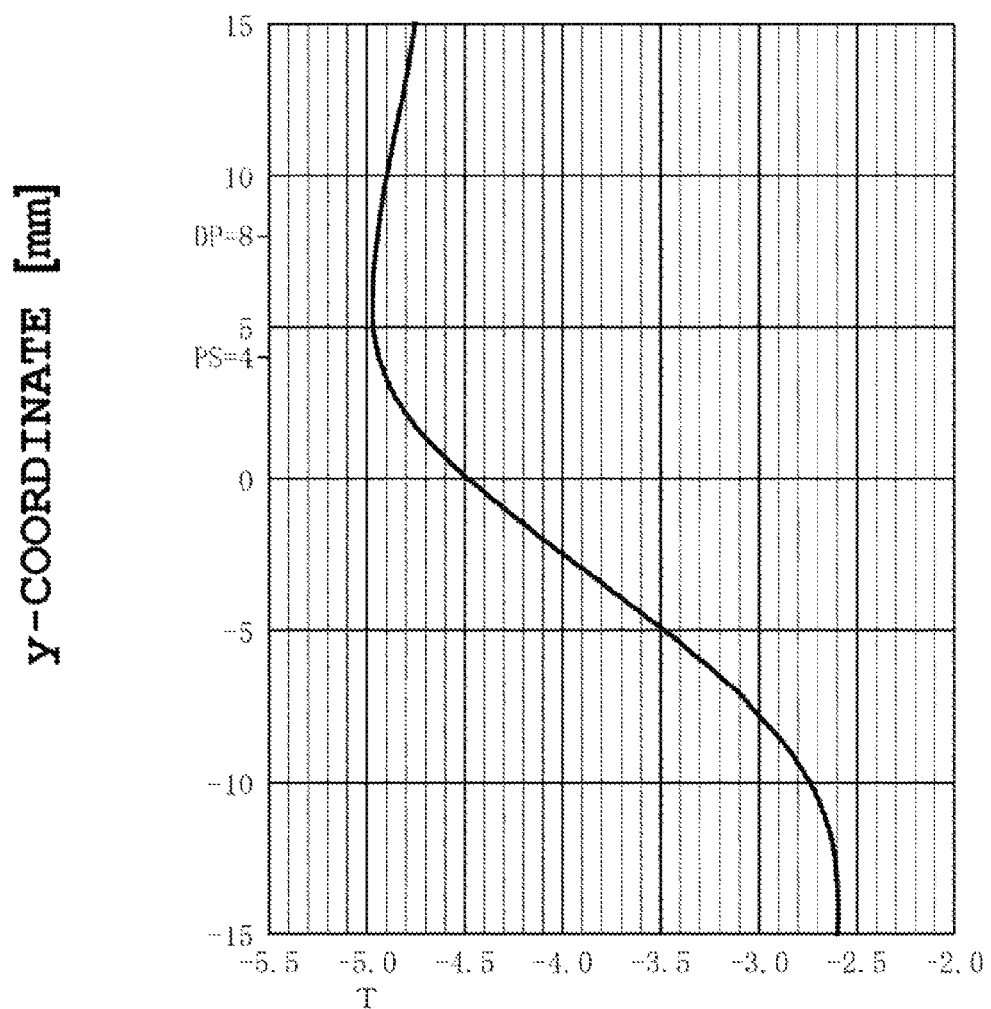
FIG. 17 is a graph showing a relation between the spherical equivalent power and the y-coordinate in comparative example 1.

In comparative example 1, as shown in the graph of FIG. 17, the as-worn spherical equivalent power D is set.

FIG. 17 is a graph of the relation between the x-coordinate showing the as-worn spherical equivalent power D and the y-coordinate according to comparative example 1.

In comparative example 1, the spherical equivalent power D at the progressive starting point PS is −4.94 dioptre when the y-coordinate is 4 mm, and the spherical equivalent power D is −4.95 dioptre when the y-coordinate is 8 mm, and the spherical equivalent power D is −4.84 when the y-coordinate is 12 mm. In comparative example 1, there is no coincidence between the spherical equivalent power D and the prescription value T, and a value near the progressive starting point PS is the value closest to the prescription value T.

Figure 18:
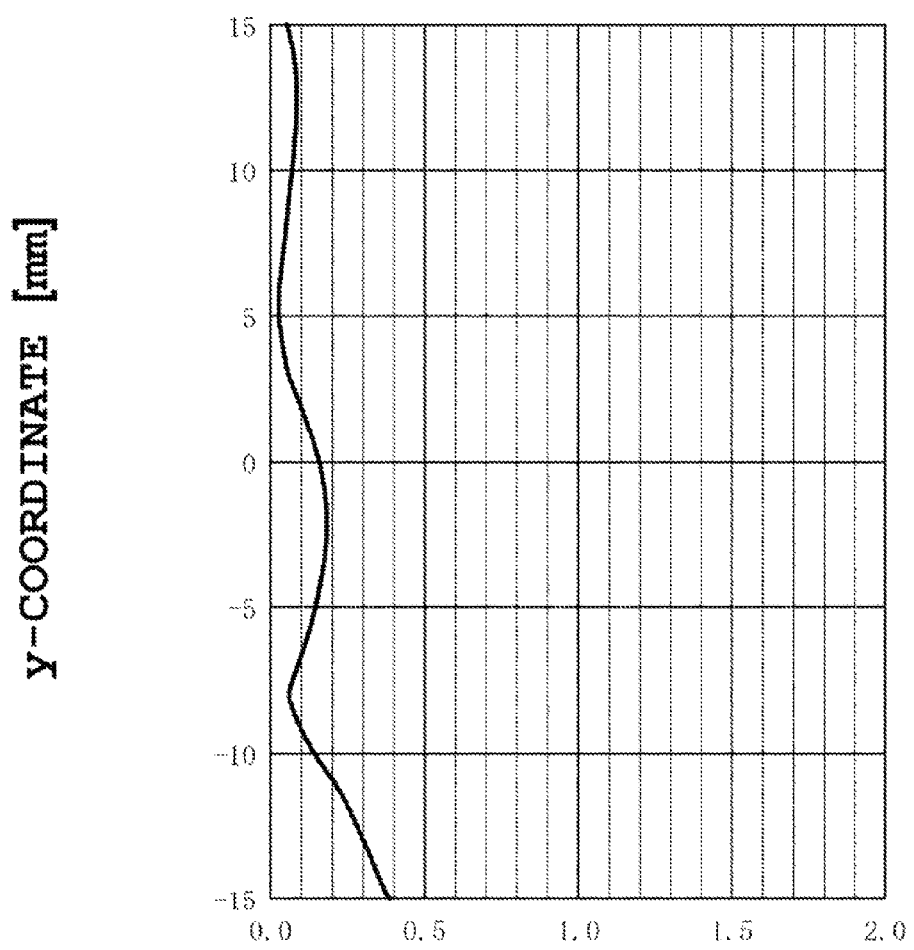
FIG. 18 is a graph showing a relation between the astigmatism and the y-coordinate in comparative example 1.

FIG. 18 is a graph showing the relation between the astigmatism and the y-coordinate according to comparative example 1.

In FIG. 18, the astigmatism in the distance area 2 is 0.07 dioptre at maximum. For example, the astigmatism is 0.02 dioptre when the y-coordinate is 4 mm, and the astigmatism, is 0.03 dioptre when the y-coordinate is 8 mm, and the astigmatism is 0.06 dioptre when the y-coordinate is 12 mm.

Figure 19:
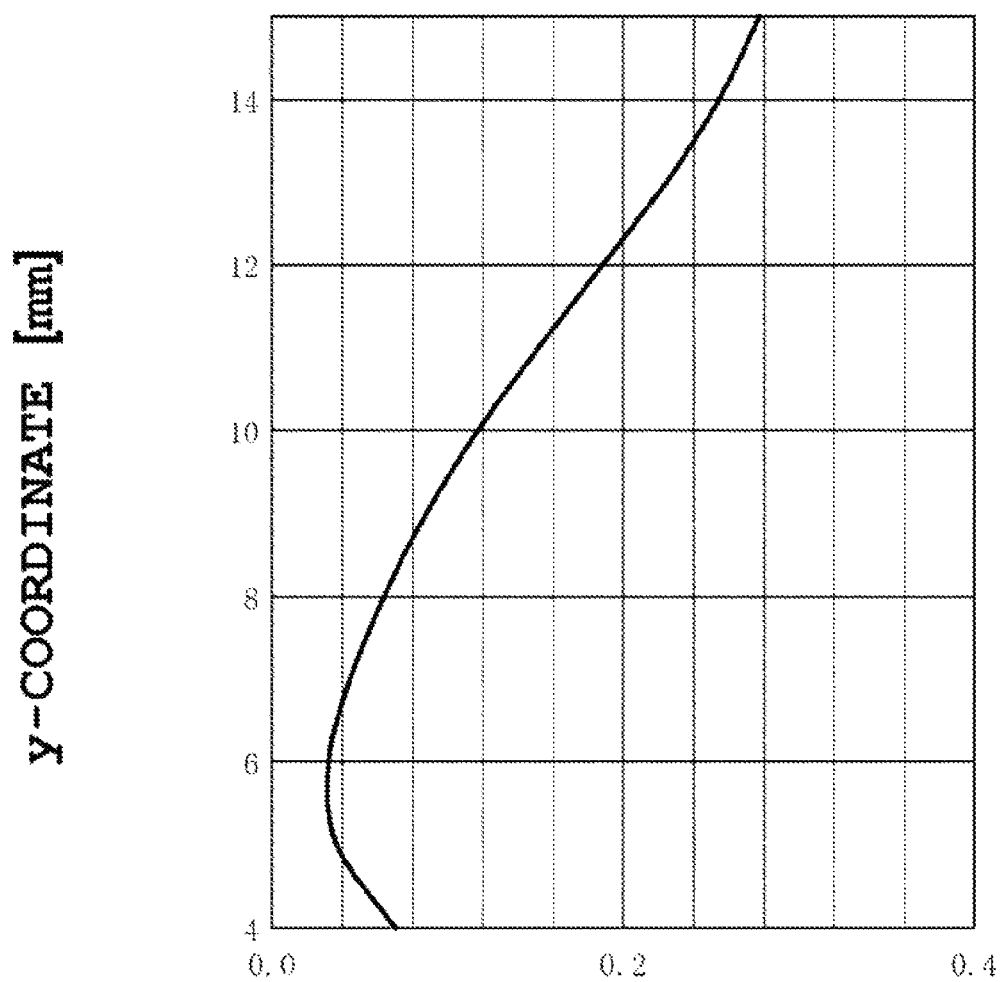
FIG. 19 is a graph showing a relation between the blur index and the y-coordinate in comparative example 1.

The relation between the blur index and the y-coordinate according to comparative example 1 is shown in FIG. 19.

In FIG. 19, the blur index is 0.07 when the y-coordinate is 4 mm, and the blur index is 0.06 when the y-coordinate is 8 mm, and the blur index is 0.19 when the y-coordinate is 12 mm.

When example 1 and comparative example 1 are compared, in example 1, the area of minus power deviation ΔD where the as-worn spherical equivalent power D is minus from the prescription value T, is included in the distance area 2, and meanwhile in comparative example 1, the area of minus power deviation ΔD does not exist. Example 1 and comparative example 1 are different from each other in this point, but other conditions are same.

When blur indexes are compared between example 1 and comparative example 1, the blur index of example 1 is higher at the point near the progressive starting point PS compared with comparative example 1. However, the blur index is low in most of the area of the distance area 2. Thus, although the blur index near the progressive starting point PS is higher in example 1 than comparative example 1, the value 0.10 is not a heavy burden on a lens wearer. Meanwhile, in comparative example 1, the blur index is 0.10 or more in an area where the y-coordinate is 9 mm or more, and when the y-coordinate exceeds 12 mm in the peripheral part of the distance area 2, the blur index is 0.20 or more, and a heavy burden is added on the lens wearer.

Accordingly, the following effect can be exhibited in this embodiment.

(1) When the prescription value T is minus, which is obtained from the formula "S+C/2" expressed by the prescribed spherical power S and the cylindrical power C in the progressive addition lens including the distance area 2, the near area 3, and the progressive area 4, with the inner surface formed into the aspheric form, the area of minus power deviation ΔD where the power deviation ΔD of the spherical equivalent power D from the prescription value T is minus, is on the principal sight line 6 in the distance area 2. Therefore, even if the spherical equivalent power D is shifted to the plus side toward the peripheral part of the distance area, the power error between the spherical equivalent power D and the prescription value T in the periphery of the distance area 2 is smaller than a conventional power error. Meanwhile, when the prescription value T is plus, the area of plus power deviation ΔD of the spherical equivalent power D from the prescription value T, is in the distance area 2. Therefore, even if the spherical equivalent power D is shifted to the minus side toward the periphery, the deviation of the spherical equivalent power D from the prescription value T is smaller than conventional in the periphery of the distance area.

Therefore, the astigmatism in the peripheral part of the distance area 2 is reduced by designing the aspherical surface, and by shift of the power of the whole distance area 2, the power error in the periphery of the distance area 2 can be reduced.

(2) By setting the power deviation ΔD to less than 0.25 dioptre, the progressive addition lens can be manufactured in the same way as conventional. Namely, the conventional method can be utilized, because the range of the power deviation ΔD is matched with the power difference of the conventional progressive addition lens in which the prescription for the spherical power S and the cylindrical power G is sorted at 0.25 dioptre pitch. Even if the value close to the prescription value T is obtained at the distance vision measurement point DP, power shift of 0.25 dioptre pitch or more occurs at the progressive starting point PS which is only several millimeters away from the distance vision measurement point DP, and therefore not the prescribed lens but the neighboring lens is fabricated against a request of a prescription side. Such a situation is not preferable.

(3) There is one point yc where the prescription value T and the as-worn spherical equivalent power D in the distance area 2, are coincide with each other, and therefore by setting the spherical equivalent power D with this point yc as a center, the progressive addition lens with less power error in the periphery of the point yc, and less power error in the peripheral part than conventional, can be easily manufactured.

(4) The as-worn spherical equivalent power D is set separately in a case that the prescription value T is minus, and in a case that the prescription value T is plus, and therefore both of the astigmatism and the power error in the peripheral part of the distance area 2 can be easily improved.

(5) Framing of the progressive addition lens 1 is preferably performed in such a manner that the circle having a diameter of 8 mm is fitted into a frame. However, according to this embodiment, point yc exists at a position of ±4 mm (at a position of 1 mm in examples 1 to 4, and at a position of −1 mm in example 5) from the position of the distance vision measurement point DP. Therefore, the spectacle having the progressive addition lens of this embodiment can be easily manufactured by a general framing method. Namely, the spectacle having the effect of this embodiment can be provided.

(6) In a case of a layout in which there is no separation of 4 mm or more between the distance vision measurement point DP and the progressive starting point PS, if the point yc is set near the progressive starting point PS, this state is incompatible with a fact that there is a power shift at the progressive starting point PS, and there is no difference between the progressive addition lens and the conventional progressive addition lens. However, according to this embodiment, there is a separation of 2 mm or more (9 mm in examples 1 to 4, and 7 mm in example 5) between the point yc and the progressive starting point PS, and therefore the abovementioned inconveniency can be prevented.

(7) Both of the aspherical surface and the progressive surface are formed on the inner surface, and the spherical surface is formed on the outer surface, and therefore by fixing the outer surface curve, a generation factor of swing or distortion is reduced, and therefore an optical performance can be improved.

The present invention is not limited to the abovementioned embodiment, and includes a modification shown below in a range of achieving the object of the present invention.

For example, in the abovementioned embodiment, explanation is given for a case that a standard progressive addition lens is used, which has the distance area 2, the near area 3, and the progressive area 4 as an example. However, if the lens having the distance area 2 and other area different from the distance area 2 is used, the present invention can be applied to a lens having any structure.

In the abovementioned embodiment, the lens is configured to have both of the progressive surface and the aspherical surface design which is combined with the progressive surface (including a toric surface for correcting astigmatism) formed on the inner surface. However, according to the present invention, if the as-worn spherical equivalent power D is set as described above, the effect can be obtained. Accordingly, the aspherical surface design (including the toric surface) may be formed on both of the inner surface and the outer surface or only on the outer surface, and the progressive surface may be formed on both of the inner surface and the outer surface or only on the outer surface. Further, both of the inner surface and the outer surface may be formed into aspherical surface shapes, and by combining them, the function of the progressive addition lens can be obtained when wearing spectacles.

DESCRIPTION OF SIGNS AND NUMERALS

1 Progressive addition lens
2 Distance area
3 Rear area (other area)
4 Progressive area (other area)
6 Principal sight line
ΔD Power deviation
Yc Point
DP Distance vision measurement point

The invention claimed is:

1. A progressive addition lens, comprising a distance area used for a distance vision, and other area different from the distance area, wherein at least one of an eyeball side surface of a wearer and an object side surface in the progressive addition lens is formed into an aspheric form, and when a prescription value T to be obtained from formula "S+C/2" expressed by a prescribed spherical power S and a cylindrical power C, is negative, the area where power deviation ΔD from the prescription value T of spherical equivalent power D goes negative, exists on principal sight line in the distance area.

2. The progressive addition lens according to claim 1, wherein point yc on the principal sight line in which the spherical equivalent power D coincides with the prescription value T, exists in the distance area, and on the principal sight line in the distance area, the power deviation ΔD goes negative in the area that is nearer to other areas than the point yc.

3. The progressive addition lens according to claim 2, wherein the point yc is positioned within ±4 mm from the position of a distance vision measurement point positioned in the distance area, and is positioned at a point 2 mm or more away from the progressive starting point positioned at an periphery portion near the other area in the periphery portion of the distance area.

4. A progressive addition lens, comprising a distance area used for a distance vision, and other area different from the distance area, wherein at least one of an eyeball side surface of a wearer and an object side surface in the progressive addition lens is formed into an aspheric form, and when a prescription value T to be obtained from formula "S+C/2" expressed by a prescribed spherical power S and a cylindrical power C is positive, the area where power deviation ΔD from the prescription value T of a spherical equivalent power D goes positive, exists on principal sight line in the distance area, wherein a point yc on the principal sight line which the spherical equivalent power D coincides with the prescription value T, exists in the distance area, and on the principal sight line in the distance area, the power deviation ΔD goes positive in the area that is nearer to other areas than point yc.

5. The progressive addition lens according to claim 4, wherein the point yc is positioned within ±4 mm from the position of a distance vision measurement point positioned in the distance area, and is positioned at a point 2 mm or more away from the progressive starting point positioned at a periphery portion close to the other area in the periphery portion of the distance area.

6. The progressive addition lens according to claim 1, wherein an absolute value of the power deviation ΔD is preferably set to less than 0.25 dioptres.

7. The progressive addition lens according to claim 1, wherein the eyeball side surface is formed into the aspheric form, and the progressive surface is formed so that a dioptric power is progressively changed from the distance area to the other area, and the object side surface is formed into a spherical surface shape.

8. The progressive addition lens according to claim 4, wherein an absolute value of the power deviation ΔD is preferably set to less than 0.25 dioptres.

9. The progressive addition lens according to claim 4, wherein the eyeball side surface is formed into the aspheric form, and the progressive surface is formed so that a dioptric power is progressively changed from the distance area to the other area, and the object side surface is formed into a spherical surface shape.

* * * * *